(12) United States Patent
Kawahara et al.

(10) Patent No.: US 6,850,356 B2
(45) Date of Patent: Feb. 1, 2005

(54) OPTICAL ELEMENT AND METHOD FOR PRODUCING THE OPTICAL ELEMENT

(75) Inventors: Jun Kawahara, Minamiashigara (JP); Masahiro Moriyama, Minamiashigara (JP); Ryojiro Akashi, Minamiashigara (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 10/752,698

(22) Filed: Jan. 8, 2004

(65) Prior Publication Data

US 2004/0252358 A1 Dec. 16, 2004

(30) Foreign Application Priority Data

Jun. 12, 2003 (JP) ........................................ 2003-167426

(51) Int. Cl.[7] .............................................. G02B 26/00
(52) U.S. Cl. ...................................................... 359/296
(58) Field of Search ................................. 359/296, 253, 359/272; 345/107, 108, 111; 430/35; 252/572

(56) References Cited

FOREIGN PATENT DOCUMENTS

| JP | A 61-151621 | 7/1986 |
|----|-------------|--------|
| JP | A 62-925 | 1/1987 |
| JP | A 4-134325 | 5/1992 |
| JP | A 5-188354 | 7/1993 |
| JP | B2 7-95172 | 10/1995 |
| JP | A 11-236559 | 8/1999 |
| JP | A 2001-350163 | 12/2001 |
| JP | A 2003-147221 | 5/2003 |

*Primary Examiner*—Georgia Epps
*Assistant Examiner*—Jack Dinh
(74) *Attorney, Agent, or Firm*—Oliff & Berridge, PLC

(57) ABSTRACT

The present invention relates to an optical element including at least; two substrates oppositely arranged; a liquid disposed between the facing surfaces of the substrates; and a chargeable polymer disposed between the facing surfaces of the substrates for swelling or contracting by absorbing or releasing the liquid when an electric field is applied, wherein (1) an area of each adhering fixing portion is smaller than a maximum sectional area of the chargeable polymer particle at the time of maximum swelling, and (2) a non-adhesive portion surrounds each adhering fixing portion, and the non-adhesive portion is disposed at least at a largest outer circumference of the chargeable polymer particle at the time of maximum swelling and extends inside the largest outer circumference of the chargeable polymer at the time of maximum swelling.

27 Claims, 3 Drawing Sheets

OPTICAL ELEMENT AND METHOD FOR PRODUCING THE OPTICAL ELEMENT

CROSS-REFERENCE TO RELATED APPLICATION

This application claims priority under 35 USC 119 from Japanese patent Application No. 2003-167426, the disclosure of which is incorporated by reference herein.

BACKGROUND OF THE INVENTION

1. Field of the Invention

The present invention relates to an optical element capable of controlling a light transmittance, light absorption and a light scattering property thereof reversibly in response to an electrical stimulus and to a method of producing the optical element. More particularly, the invention relates to an optical element that can be used in a light controlling element, a display element, a recording element, a sensor or the like each of which utilizes an electrical stimulus, and relates also to a method of producing such an optical element.

2. Description of the Related Art

An optical element technology has been known in which light is controlled or color is developed by controlling a light transmitting amount or a light scattering property by utilizing a stimulus-responsive polymer. Such a stimulus-responsive polymer reversibly swells or contracts (changes its volume) by a change in pH value, a change in ion intensity, absorption/desorption of a chemical material or a change in composition of a solvent therein, or application of a thermal, optical or electrical stimulus thereto.

For example, an element has been proposed in which an optical scattering property is controlled by changing a difference in refractive index between a solvent and a polymer due to swelling and contraction of a polymer that absorbs or releases a liquid according to a change in temperature to thereby present a display (for example, see Japanese Patent Application Laid-Open (JP-A) Nos. 61-151621, 62-925 and the like). Furthermore, the following display elements have been proposed: an element presenting a display according to a change in light scattering property of a polymer that absorbs or releases a liquid by an electrical stimulus (see JP-A No. 4-134325); an element presenting a display according to a change in light scattering property of a polymer caused by a change in pH value due to doping or dedoping of an ion to or from a conductive polymer in the polymer (see Japanese Patent Application Publication (JP-B) No. 7-95172); and an element presenting a display in cloudiness and transparency by screening, reflecting, or scattering light or by controlling a light transmittance with swelling or contraction of a polymer that absorbs or releases a liquid by an action of an electric field (see JP-A No. 5-188354).

The inventors have proposed a light controlling material in which a stimulus-responsive polymer comprises a pigment at a saturated absorption concentration or higher or a light scattering material at a saturated scattering concentration or higher (for example, see JP-A No. 11-236559). The light controlling material has strong points that the light controlling material provides a reversible large change in color and is easily applied to multicolor display. An optical element having a light controlling layer consisting of particles (polymer particles) of the light controlling material fixed on a substrate is also proposed (see, for example, JP-A No. 2001-350163). By fixing polymer particles on a substrate as recited above, aggregation of the polymer particles caused by repetition of swelling and contraction can be prevented. In addition, it is possible to manufacture an element that has an excellent color developing characteristic or light scattering characteristic when the polymer swells and which has a good contrast ratio.

The present inventors have further found a phenomenon that a chargeable polymer having a specific composition repeatedly swell or contract in an insulating organic swelling solution in accordance with a change in an electric field. Thus the inventors have manufactured an element utilizing this phenomenon (see, for example, JP-A No. 2003-147221). Such an electric-field-responsive chargeable polymer solves problems of a conventionally known current-responsive polymer such as a high power consumption, a low durability, and generation of bubbles by electrolysis of a swelling liquid. Accordingly, the electric-field-responsive chargeable polymer is expected to be applied to optical elements such as a display element, a light controlling element, and a light switch element and to a micro-machine. It has been known that the electric-field-responsive behavior of this specific chargeable polymer takes place when the chargeable polymer particles are fixed on a substrate such as an electrode. That is, it is important that chargeable polymer particles should be fixed on a substrate.

However, by a further study of the optical element having such an electric-field-responsive chargeable polymer on a substrate by the inventors, it was found that the polymer also has a problem. That is, the polymer changes its shape, contacts with the surface of a substrate, and adheres to the substrate while swelling and contraction (a volume change) of the polymer repeats in response to changes in an electric field, thereby decreasing a volume change amount as time passes.

SUMMARY OF THE INVENTION

The present invention has been made in order to solve the above problems. That is, it is an object of the invention to provide an optical element capable of retaining a constant volume change amount over time even if a chargeable polymer repeatedly swells and contracts in accordance with changes in an electric field and a production method thereof.

The inventors have conducted an intensive study on a cause for decrease in a volume change amount over time and deterioration of a responsiveness over time in a conventional optical element that uses a chargeable polymer (hereinafter also referred to as a "polymer" for short).

As a result, it has been found that what cause the problems is the process in producing a conventional electric field-responsive optical element in which process a material for fixing a polymer, such as a silane coupling agent, is applied to the entire surface of a substrate on which the polymer is to be fixed, then the polymer is fixed on the surface of the substrate.

That is, in the process, the polymer is fixed on regions on the surface of the substrate contacting with the polymer in production of an optical element, however all the other regions retains its ability to fix the polymer. Therefore, in an optical element using a conventional chargeable polymer, the polymer is very likely to adhere to the regions not having the polymer thereon, when the polymer happens to contact with the regions during repetition of swelling and contraction of the polymer.

Thus, the inventors have considered it very important, in production of an optical element, to prevent adherence over time in a region on a surface of a substrate other than a region on which the polymer is fixed and to prevent adherence over time at least in regions on the substrate which regions can contact with the polymer when the polymer swells to the maximum extent. In this way, the inventors reached the following aspects of the invention.

<1> The invention provides an optical element comprising at least:

two substrates that are disposed opposite to each other;

a liquid disposed between the facing surfaces of the opposed substrates; and at least one chargeable polymer particle disposed between the facing surfaces of the substrates for swelling or contracting by absorbing or releasing the liquid when an electric field is applied, wherein at least one of the facing surfaces has at least one adhering fixing portion that fixes the chargeable polymer particle thereon, and the chargeable polymer particle is fixed to the at least one facing surface via the adhering fixing portion, wherein (1) an area of each adhering fixing portion is smaller than the maximum sectional area of the chargeable polymer particle at the time of maximum swelling, and (2) a non-adhesive portion surrounds each adhering fixing portion, and the non-adhesive portion is disposed at least at a largest outer circumference of the charging polymer particle at the time of maximum swelling and extends inside the largest outer circumference of the chargeable polymer particle at the time of maximum swelling.

<2> The invention also provides a method for producing an optical element which comprises at least:

two substrates that are disposed opposite to each other;

a liquid disposed between the facing surfaces of the opposed substrates; and at least one chargeable polymer particle disposed between the facing surfaces of the substrates for swelling or contracting by absorbing or releasing the liquid when an electric field is applied, wherein at least one of the facing surfaces has at least one adhering fixing portion that fixes the chargeable polymer particle thereon and the chargeable polymer particle is fixed to the at least one facing surface via the adhering fixing portion, wherein (1) an area of each adhering fixing portion is smaller than the maximum sectional area of the chargeable polymer particle at the time of maximum swelling, and (2) a non-adhesive portion surrounds each adhering fixing portion, and the non-adhesive portion is disposed at least at a largest outer circumference of the charging polymer particle at the time of maximum swelling and extends inside the largest outer circumference of the chargeable polymer particle at the time of maximum swelling, the method comprising:

a fixation inhibitor providing step of providing the fixation inhibitor to the at least one facing surface;

a fixing agent providing step of providing the fixing agent to the at least one facing surface; and a patterning step of forming a region on the at least one facing surface to which region at least one agent selected from the group consisting of the fixation inhibitor and the fixing agent can be selectively provided.

<3> The invention also provides an optical element comprising at least:

two substrates that are disposed opposite to each other;

a liquid disposed between the facing surfaces of the opposed substrates; and at least one chargeable polymer particle disposed between the facing surfaces of the substrates for swelling or contracting by absorbing or releasing the liquid when an electric field is applied, wherein at least one of the facing surfaces has at least one adhering fixing portion that fixes the chargeable polymer particle thereon and the chargeable polymer particle is fixed to the at least one facing surface via the adhering fixing portion, wherein (3) an area of each adhering fixing portion is smaller than the maximum sectional area of the chargeable polymer particle at the time of maximum swelling, and (4) at least one protruding portion is provided on the at least one facing surface and the adhering fixing portion is provided on a surface of the protruding portion.

<4> The invention also provides a method for producing an optical element which comprises at least:

two substrates that are disposed opposite to each other;

a liquid disposed between the facing surfaces of the opposed substrates; and at least one chargeable polymer particle disposed between the facing surfaces of the substrates for swelling or contracting by absorbing or releasing the liquid when an electric field is applied, wherein at least one of the facing surfaces has at least one adhering fixing portion that fixes the chargeable polymer particle thereon and the chargeable polymer particle is fixed to the at least one facing surface via the adhering fixing portion, wherein (3) an area of each adhering fixing portion is smaller than the maximum sectional area of the chargeable polymer particle at the time of maximum swelling, and (4) at least one protruding portion is provided on the at least one facing surface and the adhering fixing portion is provided on a surface of the protruding portion, the method comprising a fixing agent providing step of providing the fixing agent selectively to the surface of the protruding portion by using a pattern.

DETAILED DESCRIPTION OF THE INVENTION

Figure 1:
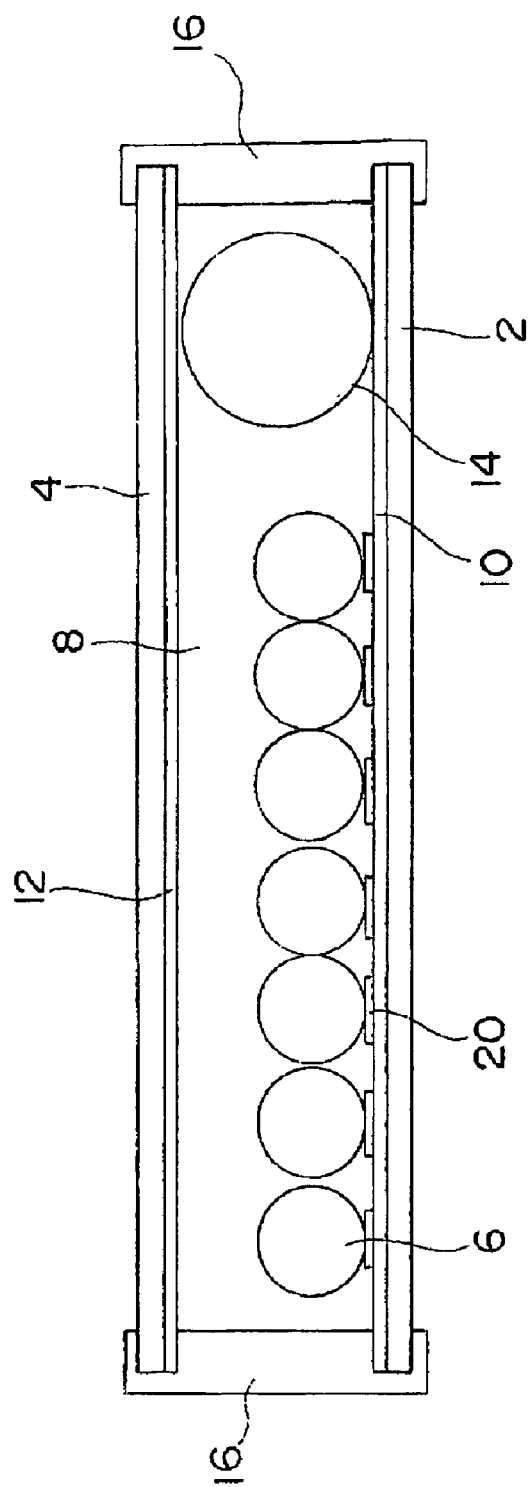
FIG. 1 is a schematic sectional view showing an example of an optical element according to a first embodiment of the invention.

Descriptions specific to the first embodiment of the invention, descriptions specific to the second embodiment of the invention, and descriptions common to the first and second embodiments will be sequentially given.
(First Embodiment of the Invention)

The optical element according to the invention comprises at least:

two substrates that are disposed opposite to each other;
a liquid disposed between the facing surfaces of the opposed substrates; and
at least one chargeable polymer particle disposed between the facing surfaces of the substrates for swelling or contracting by absorbing or releasing the liquid when an electric field is applied,
wherein at least one of the facing surfaces has at least one adhering fixing portion that fixes the at least one chargeable polymer particle thereon and the at least one chargeable polymer particle is fixed to the at least one facing surface via the adhering fixing portion,
wherein (1) an area of each adhering fixing portion is smaller than the maximum sectional area of the chargeable polymer particle at the time of maximum swelling, and
(2) a non-adhesive portion surrounds each adhering fixing portion, and the non-adhesive portion is disposed at least at a largest outer circumference of the charging polymer particle at the time of maximum swelling and extends inside the largest outer circumference of the chargeable polymer particle at the time of maximum swelling.

An optical element of the first embodiment of the invention can, therefore, retain a constant volume change amount over time even if the at least one chargeable polymer particle repeatedly swells and contracts by a change in an electric field.

Note that the term "when it swells to the maximum extent" or "at the time of maximum swelling" recited in the above items (1) and (2) means a state of the polymer particle when it swells to the maximum extent without any restriction on swelling and contraction of the polymer particle (that is, in a state that the polymer particle is neither fixed on nor adhered to a solid surface, such as a state of dispersion in a solvent or a state equivalent to the dispersion state).

The term "the largest outer circumference" included in the item (2) means the largest assumptive outer circumference of a section, on a plane parallel to the facing surfaces, of a polymer particle assuming that the polymer particle were to swell to the maximum extent without any restriction, such as the adhering fixing portion recited above, imposed by the facing surfaces, while the polymer particle were to be fixed on one of the facing surfaces via an adhering fixing portion. Further, the condition "the non-adhesive portion is disposed at least at a largest outer circumference of the charging polymer particle at the time of maximum swelling and extends inside the largest outer circumference of the chargeable polymer particle at the time of maximum swelling" is determined by projecting the largest outer circumference on the one of the facing surfaces at a right angle to the one of the facing surfaces.

As described above, it is very important in production of an optical element, to prevent adherence over time in a region on a surface of a substrate other than a region on which the polymer particle is fixed on and to prevent adherence over time at least in regions on the substrate which regions can contact with the polymer particle when the polymer particle swells to the maximum extent.

The inventors have found that it is necessary to meet the condition (2) in order to meet this requirement. When the condition (2) is satisfied, no adherence occurs even if the polymer particle repeatedly swells, contracts, thereby contacts with the region other than the adhering fixing portion since such other region is non-adhesive. Therefore, the polymer particle can retain a constant volume change amount over time.

The term "adhering fixing portion" used herein means a tiny portion on at least one of the facing surfaces of substrates that can fix one polymer particle permanently thereon when the one polymer particle is brought into contact with the tiny portion. At least one tiny region is provided on the at least one (hereinafter also referred to as "substrate surface(s)" for short) facing surface. The term "non-adhesive portion" used herein means a region that does not adhere to a polymer particle even when the region repeatedly contacts with the polymer particle. Detailed description will be given of these regions later.

It is necessary, in the invention, to meet not only the condition (2) but also the condition (1) simultaneously. When the condition (1) is not satisfied, the polymer is fixed on a substrate surface via the adhering fixing portion having a wide area in preparation of an optical element. Therefore, a sufficient volume change amount cannot be obtained, which results in insufficient optical characteristics, which are required as an optical element, such as a contrast ratio.

Adhering Fixing Portion

The "adhering fixing portion" is not specifically limited as far as the portion is a tiny region that can fix one polymer particle thereon permanently as described above. Specifically, the portion can bind a polymer particle and a substrate surface and fix the polymer particle on the substrate surface preferably chemically by chemical bonds. Such chemical bonds are selected from the group consisting of a hydrogen bond, an ionic bond, and a covalent bond. The chemical bonds are preferably ionic bonds or covalent bonds, since they have strong bonding forces and excellent stability.

In order to form such a chemical bond, a surface of a adhering fixing portion is preferably treated with, for example, an adhesive having a group capable of forming a chemical bond with a functional group in the polymer or a fixing agent such as a polyfunctional compound, a silane coupling agent, a thiol compound, a selenium compound, an inorganic compound, or a polymeric compound.

Note that a polymer can be fixed to a substrate surface via an adhering fixing portion that does not utilize such chemical reactions, as far as the polymer can be permanently fixed on the substrate surface. For example, a polymer can be fixed by mechanically by such as a tiny hook provided on the adhering fixing portion which hook can catch the polymer. A fixing method that does not utilize chemical reactions may be employed alone or in combination with a fixing method that utilizes chemical reactions.

Materials that can form chemical bonds with a polymer and can be used in the adhering fixing portion on a substrate surface can be various kinds of reactive compounds such as polyfunctional compounds and silane coupling agents. For example, compounds each having two or more polymerizable unsaturated groups and compounds each having two or more reactive functional groups can be used.

Examples of compounds each having two or more polymerizable unsaturated groups include: di(meth)acrylate esters or tri(meth)acrylate esters of polyols such as ethylene glycol, propylene glycol, trimethylolpropane, glycerinpolyoxyethylene glycol, polyoxypropylene glycol, and polyglycerin; unsaturated polyesters obtained by reactions between the above-mentioned polyols and unsaturated acids such as maleic acid and fumaric acid; bis(meth)acrylamides such as N,N'-methylenebis(meth)acrylamide; di(meth)acrylic acid carbamic acid esters obtained by reactions of polyisocyanates such as tolylenediisocyanate and hexamethylenediisocyanate with hydroxyethyl (meth)acrylate; and polyvalent allyl compounds such as allylated starch, allylated cellulose, diallyl phthalate, other tetraallyloxyethanes, pentaerythritol triallyl ether, trimethylol propanetriallyl ether, diethyleneglycol diallyl ether, and triallyl trimethyl ether.

Among them, ethyleneglycol di(meth)acrylate, porpyleneglycol di(meth)acrylate, polyethyleneglycol di(meth)acrylate, polypropyleneglycol di(meth)acrylate, N,N'-methylenebis(meth)acrylamide and the like are preferable according to the invention.

The material having two or more reactive functional groups, can be a diglycidyl ether compound, a haloepoxy compound, a diisocyanate compound or a triisocyanate compound.

Specific examples of the diglycidyl ether compound include ethyleneglycol diglycidyl ether, polyethyleneglycol diglycidyl ether, propyleneglycol diglycidyl ether, polypropyleneglycol diglycidyl ether, glycerin diglycidyl ether, and polyglycerin diglycidyl.

Examples of the haloepoxy compound include epichlorohydrin, epibromohydrin, and β-methylepichlorohydrin. Specific examples of the diisocyanate compound include 2,4-tolylenediisocyanate and hexamethylenediisocyanate.

Furthermore, various kinds of silane coupling agents can be used. Examples thereof include vinyl type silane coupling agents such as vinyltrimethoxysilane and vinyltriethoxysilane; amino type silane coupling agents such as N-(2-aminoethyl) 3-aminopropylmethyldimethoxysilane, N-(2-aminoethyl) 3-aminopropyltrimethoxysilane, and 3-aminopropyltrimethoxysilane; and epoxy type silane coupling agents such as 3-glycidoxypropyltrimethoxysilane, 3-glycidoxypropylmethyldimethoxysilane, and 2-(3,4-epoxycyclohexyl)ethyltrimethoxysilane.

Among them, according to the invention, amino type silane coupling agents such as N-(2-aminoethyl) 3-aminopropylmethyldimethoxysilane, N-(2-aminoethyl) 3-aminopropyltrimethoxysilane, and 3-aminopropyltrimethoxysilane are especially preferable.

A shape of an adhering fixing portion that occupies a part of an area of a substrate surface is not specifically limited as far as the area of the adhering fixing portion is less than the largest of sectional areas of a polymer particle at the time of maximum swelling which section area are on planes parallel to the substrate surface. A shape of an adhering fixing portion can be a circle, an ellipse, a triangle, a polygon, a rectangle, a square, an irregular shape, or a stripe.

Among them, it is especially advantageous that a shape of an adhering fixing portion is circular since not only can a polymer particle be fixed more stably, but also deterioration in volume change characteristic of a polymer particle during fixation is small. When a shape of an adhering fixing portion is circular, a size of a circular pattern is preferably in the range of from 1 μm to 50 μm in diameter though depending on a size of a polymer to be used.

While an area of an adhering fixing portion has only to be less than the largest sectional area of the polymer at the time of maximum swelling as described above in item (1), the area is preferably less than the largest sectional area of the polymer at the time of maximum contraction in order to increase an absolute volume change amount of the polymer. The term "when the polymer contracts to the maximum extent" or them "at the time of maximum contraction" means a state of the polymer when it contracts to the maximum extent without restriction on swelling and contraction of the polymer (that is, a state that the polymer is neither fixed on nor adhered to a solid surface such as a substrate surface, such as a state of a dispersion in a solvent or a state equivalent to the dispersion state).

Arrangement of adhering fixing portions provided on a substrate surface may be regular, periodical, or at random. An area proportion occupied by the adhering fixing portions on the substrate surface is desirably in the range of from 5% to 50% relative to all the area of a region, on the substrate surface, where polymer can be arranged (regardless of whether or not the polymer can be fixed).

Non-Adhesive Portion

A characteristic of a surface of a non-adhesive portion is not specifically limited as far as the portion does not adhere to a polymer particle even when the polymer particle contacts with the portion repeatedly. Specifically, the portion is preferably substantially unable to form chemical bonds (hydrogen bonds, ionic bonds, and covalent bonds) with a polymer which bonds are sufficient for fixing the polymer.

Even if a non-adhesive portion is not covered with a fixing agent such as any of the fixing agents cited above, when a non-adhesive, not reacting with a polymer, has a comparatively high chemical affinity as in cases of such as a surface of a glass substrate used as a substrate body or a surface of a transparent conductive ceramics such as ITO (indium tin oxide) provided on a surface of a substrate, a polymer easily adhere to the portion over time in some cases.

Considering such conditions, a surface of a non-adhesive portion more preferably has a low chemical affinity to a polymer. Specifically, a surface tension of a non-adhesive portion is preferably 30 mN/m or lower and more preferably 20 mN/m or lower.

From such a view point, a non-adhesive portion is preferably covered with a material including, in a molecule, almost no or absolutely no functional group having a reactivity, almost no or absolutely no functional group that can form a hydrogen bond such as a hydroxyl group, and almost no or absolutely no moiety that can form a hydrogen bond such as an oxygen atom in an ether bond. For example, a hydrocarbon based material (such as a resin, a coupling agent or the like), a fluorine-type material (such as a resin, a coupling agent or the like) having a surface energy which is lower than a hydrocarbon based material, or the like.

Examples of such materials include fixation inhibitors such as a hydrocarbon based resin, a fluororesin, a silicone based resin, an alkyl type silane coupling agent, a fluorinated alkyl based silane coupling agent, an alkyl type thiol, and a fluorinated alkyl based thiol. In this case, a fixation inhibitor is applied to a region serving as a non-adhesive portion on a substrate surface.

It is naturally possible to form a material, corresponding to the above-cited materials, having a low chemical affinity to a polymer directly on a substrate surface (for example, a glass substrate surface, an electrode made of transparent ceramics such as ITO or the like) by deposition, sputtering, or the like.

When a fixation inhibitor having a reactive functional group such as a silane coupling agent or an alkyl type thiol is used, a material containing only one functional group in a molecule thereof or a material containing functional groups only at one end of a molecule thereof is preferably used. This is because such (a) reactive functional group(s) is/are bonded only to the substrate surface with certainty, and a moiety (such as an alkyl group or a fluorinated alkyl group) in a molecule which moiety has a low chemical affinity to a polymer is oriented away from the substrate surface.

Specific examples of fixation inhibitors each having a fluorinated alkyl group include fluororesins such as polvinyl fluoride, polyvinylidene fluoride, polytetrafluoroethylene, ethylene-tetrafluoroethylene copolymer, and tetrafluoroethylene-perfluoroalkyl vinyl ether copolymer. Examples of fixation inhibitors each having a slioxane group include silicone based resins such as dimethyl silicone, methylphenylsilicone, an amino-modified silicone, an epoxy-modified silicone, a carboxyl-modified silicone, a methacrylic-modified silicone, a phenol-modified silicone, and an alkyl-modified silicone.

When any of such fixation inhibitors having a reactive functional group is used, the fixation inhibitor is dissolved or dispersed in a solvent and a substrate is immersed in the solution to thereby apply a fixation inhibitor to a substrate surface.

Examples of fixation inhibitors (resin materials) each of which scarcely adheres to a polymer include urea resins, epoxy resins, polyvinyl chloride, polyethyl methacrylate, polyvinyl acetate, Nylon, polyethyleneterephthalate, polyvinyl alcohol, polystyrene, polyethylene, and polypropylene.

A non-adhesive portion provided on a substrate surface is provided around an adhering fixing portion fixing a polymer particle and a region of the non-adhesive portion is not specifically limited as far as the portion extends inside the largest outer circumference of an polymer (the polymer being fixed on the adhering fixing portion) at the time of maximum swelling and the largest outer circumference is in the non-adhesive portion, wherein the outer circumference is on a plane parallel to a substrate surface.

For example, to be simple, a substrate surface can be constituted of two regions, which are an adhering fixing portion and a non-adhesive portion. A material causing a decrease in volume change amount over time (for example, a glass surface, an ITO electrode surface or the like, which is a surface of a material constituting a substrate or an original substrate surface) may be exposed in a region outside of the largest outer circumference of the polymer at the time of maximum swelling, the polymer being fixed on the adhering fixing portion.

An area proportion occupied by non-adhesive portions on a substrate surface is desirably in the range of from 5% to 50% relative to all the area of a region, on the substrate surface, where polymer can be arranged (regardless of whether or not the polymer can be fixed).

Constitution of Optical Element

While description will be given, then, of a specific constitution example of an optical element of the first embodiment of the invention with reference to the accompanying drawings, an optical element according to the first embodiment of the invention is not limited only to the examples described below.

FIG. 1 is a schematic sectional view showing an example of an optical element according to a first embodiment of the invention. In FIG. 1, a numerical mark 2 indicates a substrate, 4 a transparent electrode, 6 a polymer (particles), 8 a liquid, 10 and 12 electrodes, 14 a spacer, 16 a sealing member and 20 adhering fixing portions.

An optical element shown in FIG. 1 is consitituted of: two substrates that are disposed opposite to each other (the substrate 2 and the transparent substrate 4); the polymer 6 disposed between the facing surfaces; the liquid 8 and the spacer 14; and the sealing member 16 provided so as to cover end portions of the substrate 2 and the transparent substrate 4, that is to seal both ends of the substrates (the substrate 2 and the transparent electrode 4) oppositely arranged.

The electrode 10 is provided on the surface of the substrate 2 opposed to the transparent substrate 4. The transparent electrode 12 is provided on the surface of the transparent substrate 4 opposed to the substrate 2. In order to maintain a constant spacing between the two facing surfaces, the spacer 14 is arranged in contact with the two facing surfaces (the electrode 10 and the transparent electrode 12).

The polymer 6 is fixed on the substrate 2 via the adhering fixing portion 20 provided on a surface of the electrode 10 provided on the surface of the substrate 2 opposed to the transparent substrate 4. In FIG. 1, while an adhering fixing portion 20 is depicted as though it had a thickness in the thickness direction of the substrate 2 for facilitating description, the portion 20 actually has substantially no thickness (flush with a plane of the electrode 10 with respect to the thickness direction of the substrate 2). On the other hand, a region on the surface of the electrode 10 where no adhering fixing portion 20 is provided is a non-adhesive portion. A polymer particle 6 shown in FIG. 1 is at the time of maximum swelling.

Figure 2:
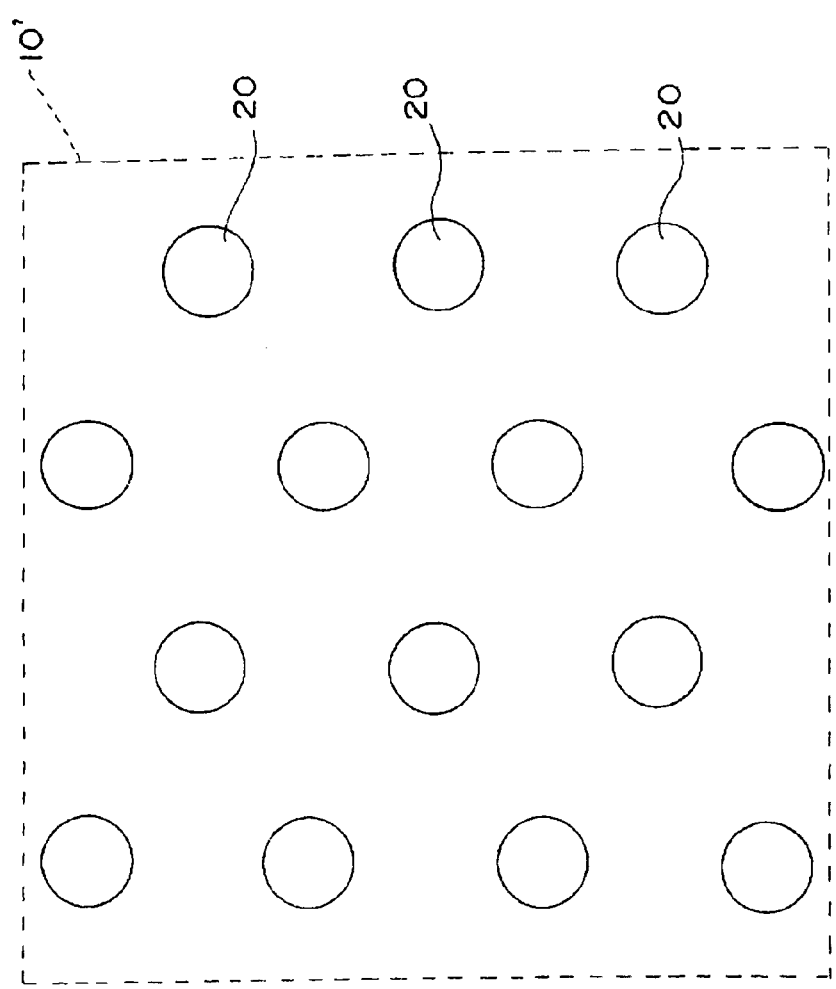
FIG. 2 is a schematic view showing an example of shapes and arrangement pattern of adhering fixing portions 20 provided on one (a surface of an electrode 10) of facing surfaces of the optical element shown in FIG. 1, projected on a plane (a plane intersecting with the thickness direction of the optical element at a right angle).

FIG. 2 is a schematic view showing an example of shapes and arrangement pattern of adhering fixing portions 20 provided on a surface (the surface of an electrode 10) opposed to the transparent substrate 4 of the optical element shown in FIG. 1, sectioned by a plane (a plane intersecting with the thickness direction of the optical element at a right angle).

In FIG. 2, a region indicated with a numerical mark 10' and enclosed with a dotted line is a part of the surface of the electrode 10. In FIG. 2, the adhering fixing portions 20 each have a circular shape. The adhering fixing portions are arranged in a zigzag pattern so that polymer particles can be arranged regularly. The region between the adhering fixing portions 20 is a non-adhesive region.

In the example shown in FIG. 1, though the polymer particles 6 are fixed on only one (the surface of the electrode 10) of the facing surfaces of substrates, the polymer particles 6 may also be further fixed to the other one (the surface of the transparent electrode 12) of the facing surfaces. In the latter case, the adhering fixing portions are provided also on the surface of the transparent electrode 12. An electrode may be provided only on one substrate.

Production Method of Optical Element

Description will be given of a production method of an optical element according to the first embodiment of the invention with adhering fixing portions and non-adhesive portions as a main topic.

Adhering fixing portions or non-adhesive portions can be provided on a substrate surface by forming films of a material that can form the portions directly from a gas phase by a chemical vapor deposition method, a vacuum evaporation method, an ion plating method or the like. Alternatively, the portions can be provided on a substrate surface by a coating method, an immersion method, a sol-gel method, a pyrosol method or the like, which uses a solution including a fixing agent or a fixation inhibitor.

When an original surface of a substrate functions as an adhering fixing portion or a non-adhesive portion without the above treatments, the surface can be used as an adhering fixing portion and a non-adhesive portion as it is.

In order to form the adhering fixing portions and the non-adhesive portions selectively on a substrate surface, known patterning methods can be adopted, such as various printing methods, lithography methods, soft lithography methods, and masking methods. Furthermore, it is also possible to form adhering fixing portions and non-adhesive portions in a pattern by spraying a solution including a fixing agent or a fixation inhibitor on a substrate surface using an ink-jet method.

While no specific limitation is imposed on the order in which adhering fixing portions and non-adhesive portions are formed on an inside surface and either of them may be formed earlier. However, it is preferable to provide, on the surface, a region in which the adhering fixing portions and the non-adhesive portions can be selectively formed, by applying the patterning method at least once before or after the step of forming the adhering fixing portions or the step of forming the non-adhesive portions, or between the both steps.

For example, when a fixing agent is used in order to form adhering fixing portions and a fixation inhibitor is used in order to form non-adhesive portions, an optical element according to the first embodiment is preferably produced, at least, through a fixation inhibitor providing step of providing the fixation inhibitor to at least one of the facing surfaces; a fixing agent providing step of providing the fixing agent to the at least one of the facing surfaces; and a patterning step of forming a region in which at least one kind selected from a fixation inhibitor and a fixing agent can be provided on the at least one of the facing surfaces.

In this case, the order of the three steps are not particularly limited and, for example, the steps can be conducted as follows: First, 1) a photoresist is applied to at least one of the facing surfaces, patterning is conducted, thereby forming a region A from which the resist has been removed and a region B which is covered with the resist. Then, 2) a solution including a fixation inhibitor is applied to the region A to form a non-adhesive portion selectively on the at least one of the facing surfaces and then, 3) the resist with which the region B is covered is removed and the fixing agent is provided to this region, thereby forming an adhering fixing portion selectively on the at least one of the facing surfaces.

(Second Embodiment of the Invention)

Then, description will be given of an optical element according to the second embodiment of the invention.

An optical element according to the second embodiment of the invention includes at least:

two substrates that are disposed opposite to each other;

a liquid disposed between the facing surfaces of the opposed substrates; and at least one chargeable polymer particle disposed between the facing surfaces of the substrates for swelling or contracting by absorbing or releasing the liquid when an electric field is applied, wherein at least one of the facing surfaces has at least one adhering fixing portion that fixes the at least one chargeable polymer particle thereon and the at least one chargeable polymer particle is fixed to the at least one facing surface via the adhering fixing portion, wherein (3) an area of each adhering fixing portion is smaller than the maximum sectional area of the chargeable polymer particle at the time of maximum swelling, and (4) at least one protruding portion is provided on the at least one facing surface and the adhering fixing portion is provided on a surface of the protruding portion.

An optical element of the second embodiment of the invention can, therefore, retain a constant volume change amount over time even if the at least one chargeable polymer particle repeatedly swell(s) and contract(s) by a change in an electric field.

Note that the term "when it swells to the maximum extent" or "at the time of maximum swelling" recited in the above items (3) and (4) means a state of the polymer particle when it swells to the maximum extent without any restriction on swelling and contraction of the polymer particle (that is, in a state that the polymer particle is neither fixed on nor adhered to a solid surface, such as a state of dispersion in a solvent or a state equivalent to the dispersion state).

As described above, it is very important in production of an optical element, to prevent adherence over time in a region on a surface of a substrate other than a region on which the polymer particle is fixed on and to prevent adherence over time at least in regions on the substrate which regions can contact with the polymer particle when the polymer particle swells to the maximum extent.

The inventors have found that it is possible to satisfy such conditions. As a result of an intensive study further conducted by the inventors on a constitution of an optical element different from an optical element of the first embodiment of the invention, it has been found that it is necessary to satisfy the condition (4).

In this case, a polymer particle cannot contact with a region (flat portion) other than protruding portions on at least one of the facing surfaces even when the polymer particle repeatedly swells and contracts since the polymer particle is fixed to an adhering fixing portion on surface(s) of at least one of the protruding portions provided on at least one of the facing surfaces. Hence, if the flat portion is a region that can adhere to a polymer particle when the region contacts with the polymer particle, no adherence occurs according to the second embodiment of the invention, since the polymer particle never contacts with the flat portion. Therefore, the polymer can retain a constant volume change amount over time.

A protruding portion, which is provided on any one of the facing surfaces is not particularly restricted in a sectional shape on a vertical plane of the optical element or a sectional shape on a horizontal plane as far as it is protruding toward the other one of the facing surfaces. The top part of the protruding portion is preferably flat from the viewpoints of formation of the adhering fixing portion thereon and easiness in fixing the polymer thereon. While a sectional shape on a horizontal plane can be arbitrarily selected, it is preferably circular.

A height of the protruding portion is not particularly restricted. Here, the "height" is defined by providing a height of a region (a flat portion) other than protruding portions on a surface having the protruding portions is a reference height (0 $\mu$m). The height is preferably fixed at least 1 $\mu$m, more preferably at least 5 $\mu$m and most preferably at least 15 $\mu$m in order to ensure prevention of the contact between polymer and a region (a flat portion) other than protruding portions when the polymer swells or contracts. While the upper limit of a height of the protruding portion is not specifically limited, it is practically preferable to be 100 $\mu$m or less.

Protruding portions on a surface of a substrate facing the other substrate can be easily obtained by treating the substrate (or an electrode provided on said surface) by a known method such as a printing method, an etching method, a pressure stamper, or an injection molding method.

According to the second embodiment of the invention, it is necessary to satisfy both the conditions (3) and (4). When the condition (3) is not satisfied, a polymer is fixed on a substrate surface via an adhering fixing portion having a large area in preparation of an optical element. Therefore, a sufficient volume change cannot be obtained, which results in insufficient optical characteristics, which are required as an optical element, such as a contrast ratio.

It is preferable that an adhering fixing portion formed on a surface of a protruding portion is selectively formed on the top portion of the protruding portion if the top portion is flat. If the top portion is not flat, an adhering fixing portion is preferably formed in a portion with a height of at least 1 $\mu$m with respect to a region (a flat region) other than protruding portions.

In the second embodiment of the invention, an adhering fixing portion provided on a surface of a protruding portion is absolutely the same as in the case of the first embodiment of the invention described above. On the other hand, no specific limitation is imposed on an adhering performance/a fixing performance, toward a polymer, of a surface region (a flat region) other than protruding portions. Preferably, the surface of the flat region has no such fixing ability as that of an adhering fixing portion in order to prevent the polymer to be fixed on the flat region during preparation of an optical element. Specifically, the surface of the region may be not specially coated or processed, or the region may be a non-adhesive portion described above.

Constitution of Optical Element

While description will be given of a specific construction example of an optical element according to the second embodiment of the invention using the drawings, the optical element according to the second embodiment of the invention is not limited only to the example shown below.

Figure 3:
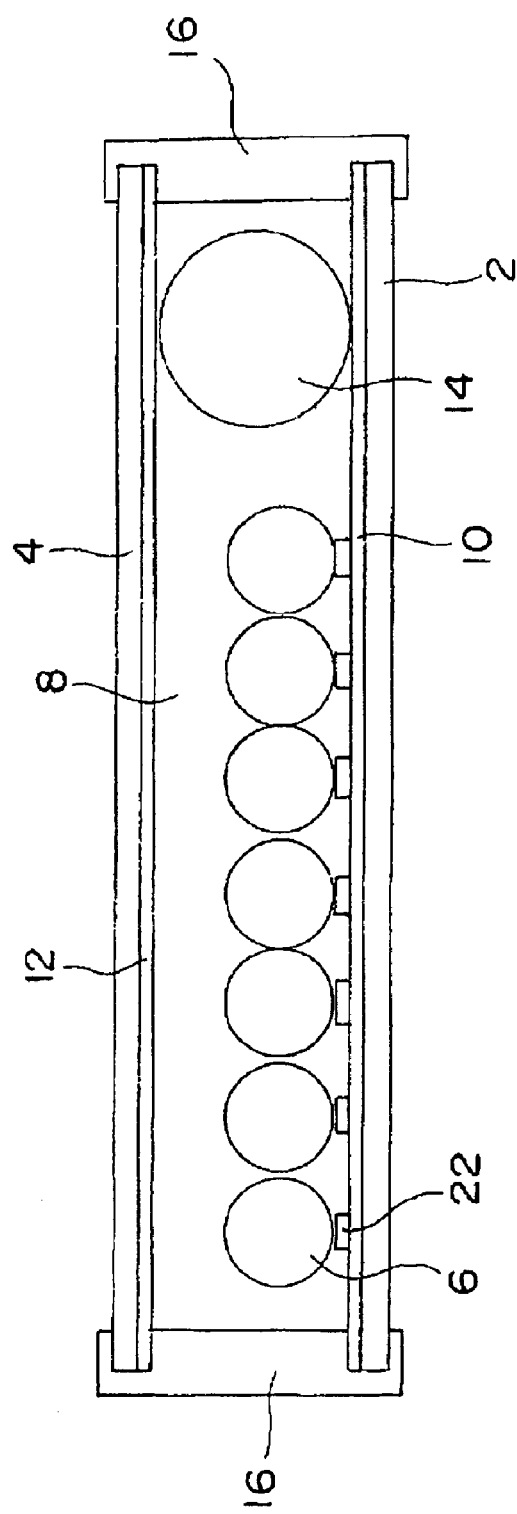
FIG. 3 is a schematic sectional view showing an example of an optical element according to a second embodiment of the invention.

FIG. 3 is a schematic sectional view showing an example of an optical element according to the second embodiment of the invention. In FIG. 3, a numerical mark 22 indicates protruding portions and constituents indicated by the other marks are respectively the same as corresponding constituents shown in FIG. 1.

While an optical element shown in FIG. 3 has almost the same construction as the optical element shown in FIG. 1, protruding portions 22 each having flat top-portion are provided on the surface of a substrate 2 facing the transparent substrate 4, polymer particles 6 are fixed to the surface of a substrate 2 facing the transparent substrate 4 via adhering fixing portions which is not shown and is provided on the top portions of the protruding portions 22. In a region other than the protruding portions (which is a flat region), a material constituting the electrode 10 is exposed.

In FIG. 3, in an optical element while no specific limitation is imposed on shapes and an arrangement pattern, projected on a horizontal plane (a place intersecting with the thickness direction of the optical element at a right angle), of portions (the top portions of the protruding portions 22) having adhering fixing portions.

In the example shown by FIG. 3, a polymer 6 in the example shown in FIG. 3 is bound only to the surfaces of protruding portions 22 provided on the surface (the surface of an electrode 10) on one (the substrate 2) of the substrates. However, the polymer 6 may be bound also to the surface (the surface of the transparent electrode 14) of the other substrate (the transparent substrate 4) by providing protruding portions to the surface and providing adhering fixing portions on the provided protruding portions.

Production Method of Optical Element

Description will be given of a production method of an optical element of the second embodiment of the invention with formation of adhering fixing portions as a main topic.

An adhering fixing portion can be provided on a protruding portion on a surface of a substrate facing the other substrate by forming films of a material that can form the portions directly from a gas phase by a chemical vapor deposition method, a vacuum evaporation method, an ion plating method or the like. Alternatively, the portions can be provided by a coating method, an immersion method, a sol-gel method, a pyrosol method or the like, which uses a solution including a fixing agent.

Adhering fixing portions on an at least one of facing surfaces can be formed on surfaces of protruding portions by forming a film directly on the facing surface with a material of which the adhering fixing portions are made by means of a chemical vapor deposition method, a vacuum evaporation method, an ion plating method or the like and by means of a coating method, an immersion method, a sol-gel method, a pyrosol method or the like, using a solution including a fixing agent.

When an original surface of a protruding portion functions as an adhering fixing portion without the above treatments, the surface can be used as an adhering fixing portions as it is.

In order to form adhering fixing portions selectively on surfaces of protruding portions on the surface of a substrate facing the other substrate, known patterning methods can be adopted, such as various printing methods, lithography methods, soft lithography methods, and masking methods. Furthermore, it is also possible to form adhering fixing portions in a pattern by spraying a solution including a fixing agent on surfaces of protruding portions on the surface of a substrate facing the other substrate using an ink-jet method.

When adhering fixing portions are formed on surfaces of protruding portions on the surface of a substrate facing the other substrate, it is preferable to form the adhering fixing portions selectively on the surfaces of the protruding portions by using a patterning technique. For example, when a fixing agent is used for forming adhering fixing portions, an optical element according to the second embodiment of the invention is preferably produced in a process including at least a fixing agent providing step of selectively providing the fixing agent on the protruding portions by employing a patterning technique.

Specifically, for example, adhering fixing portions are formed on surfaces of protruding portions each having flat top portions through;

covering the entire surfaces of the surface having the protruding portions with a resist;

removing the resist by exposure to light and development so that the top portions of the protruding portions are exposed;

coating the exposed top portions with a solution containing a fixing agent.

(Explanations Common to the First Embodiment and the Second Embodiment of the Invention)

Description will be given of features common to the first and second embodiments of the invention described above.

A chargeable polymer used in the invention can be any of (A) an ionic polymer, (B) an ionic polymer containing chargeable particles and (C) a nonionic polymer containing chargeable particles. In the following, specific examples of chargeable polymers that can be used in the invention are cited.

(A) Ionic Polymer

Examples of ionic polymers include: cross-linked products of poly(meth)acrylic acid and salts thereof; cross-linked copolymers of (meth)acrylic acid with (meth)acrylamide, hydroxyethyl(meth)acrylate, alkyl (meth)acrylate ester or the like, and salts thereof; cross-linked products of polymaleic acid and salts thereof; cross-linked copolymers of maleic acid with (meth)acrylamide, hydroxyethyl (meth) acrylate, alkyl (meth)acrylate ester or the like and salts thereof; cross-linked products of polyvinylsulfonic acid; cross-linked copolymers of vinylsulfonic acid with (meth)

acrylamide, hydroxyethyl (meth)acrylate, alkyl (meth) acrylate ester or the like, and salts thereof; cross-linked products of polyvinybenzenesulfonic acid and salts thereof; cross-linked copolymers of vinybenzenelsulfonic acid with (meth)acrylamide, hydroxyethyl (meth)acrylate, alkyl (meth)acrylate ester or the like, and salts thereof; cross-linked products of polyacrylamidealkylsulfonic acid and salts thereof; cross-linked copolymers of acrylamidealkyl-sulfonic acid with (meth)acrylamide, hydroxyethyl (meth) acrylate, alkyl (meth)acrylate ester or the like, and salts thereof; cross-linked products of polydimethylaminopropyl (meth)acrylamide, and hydrochloric acid salts thereof; cross-linked copolymers of dimethylaminopropyl(meth) acrylamide with (meth)acrylic acid, (meth)acrylamide, hydroxyethyl (meth)acrylate, alkyl (meth)acrylate ester or the like, quarternarized products thereof, and salts thereof; cross-linked composites of polydimethylaminopropyl(meth) acrylamide and polyvinylalcohol, quarternarized products thereof, and a salt thereof; cross-linked composites of poly-vinylalcohol and poly(meth)acrylic acid and salts thereof; cross-linked products of carboxyalkylcellulose salt, and partially hydrolyzed cross-linked products of poly(meth) acrylonitrile and salts thereof.

In the examples, the expression "(meth)acrylate" collectively means both of acrylate and methacrylate.

The polymers described above can be prepared by cross-linking polymers three-dimensionally by adding a cross-linking agents to the polymers, by irradiating the polymers with radiation such as electron beam or γ ray, by heating the polymers, or by adding peroxide to the polymers.

(B) Ionic Polymer Containing Chargeable Particles

Ionic polymers that can be used as the ionic polymers in the item (A) can be used as ionic polymers of chargeable particles-containing ionic polymers.

Examples of chargeable particles contained in such ionic polymers include: various kinds of amphiphatic polymers; nigrosine-based compounds; alkoxylated amines, quaternary ammonium salts, alkyamides; simple substances of phosphorus and tungsten and compounds thereof; molybdenum chelate pigments, hydrophobic silicas, boron compounds, halogenated compounds, metal complex salts of monoazo dyes, salicylic acid, alkylsalicylic acids, dialkyl-salicylic acids, a metal complex salts of naphthoic acid, chlorinated polyolefin, chlorinated polyester, polyester with excessive acid groups, sulfonylamines of copper-phthaocyanine, oil black, metal salts of naphthenic acid, metal salts of fatty acid, soap of resin acid; and the like.

An amount of chargeable particles contained in an ionic polymer is preferably in the range of from 2% by weight to 70% by weight.

Chargeable particles may serve also as a light controlling material described later. A concentration of a light controlling material contained in an ionic polymer is preferably in the range of from 2% by weight to 70% by weight and more preferably in the range of from 5% by weight to 50% by weight. Chargeable particles other than a light controlling material may be contained in an ionic polymer in order to improve a responsiveness of an ionic polymer to an electric field. An amount of such chargeable particles other than a light controlling material contained in an ionic polymer is preferably in the range of from 2% by weight to 70% by weight.

(C) Nonionic Polymer Containing Chargeable Particles

Then, description will be given of a nonionic polymer containing chargeable particles. In the invention, the term "nonionic polymer" used herein means a polymer having no ionically dissociative group in a polymer chain constituting the polymer.

Preferable examples of the nonionic polymer include, specifically, cross-linked products of homopolymers which are each made of one of the monomers listed below or cross-linked products of copolymers made of two or more of the monomers listed below.

Examples of such monomers include: (meth)acrylonitrile, alkyl (metha)acrylate ester, dialkylaminoalkyl (meth) acrylate esters, (meth)acrylamide, ethylene, propylene, butadiene, isoprene, isobutylene, N-dialkyl substituted (meth)acrylamide, vinylpyridine, vinylamine, allylamine, styrene, styrene derivatives, vinylcarbazole, vinylpyrrolidone, ethyleneglycol di(meth)acrylate, glyceryl (meth)acrylate, polyethyleneglycol mono(meth)acrylate, vinyl chloride, vinylidene chloride, ethyleneglycol di(meth) acrylate, methylenebisacrylamide, diethyleneglycol di(meth)acrylate, butanediol di(meth)acrylate, and hex-anediol (meth).

In addition, cross-linked products of polyester-based polymers, cross-linked products of polyvinylacetal derivatives, cross-linked products of polyurethane-based polymers, cross-linked products of polyurea-based polymers, cross-linked products of polyether-based polymers, cross-linked products of polyamide-based polymers, cross-linked products of polycarbonate-based polymers and the like can be preferably used.

The polymers described above can be prepared by cross-linking polymers three-dimensionally by adding a cross-linking agents to the polymers, by irradiating the polymers with radiation such as electron beam or γ ray, by heating the polymers, or by adding peroxide to the polymers.

As chargeable particles contained in the nonionic polymers described above, there can be exemplified chargeable particles that are cited in the explanation, in the above item (B), of the ionic polymers containing chargeable particles.

An amount of chargeable particles contained in a nonionic polymer is preferably in the range of from 2% by weight to 70% by weight.

Chargeable particles may serve also as a light controlling material described later. A concentration of a light controlling material contained in an ionic polymer is preferably in the range of from 2% by weight to 70% by weight and more preferably in the range of from 5% by weight to 50% by weight. Chargeable particles other than a light controlling material may be contained in an ionic polymer in order to improve a responsiveness of an ionic polymer to an electric field. An amount of such chargeable particles other than a light controlling material contained in an ionic polymer is preferably in the range of from 2% by weight to 70% by weight.

The polymer used in the invention preferably has a volume change ratio (a volume of the polymer at the time of maximum swelling/a volume of the polymer at the time of maximum contraction) of generally 5 or greater and preferably 10 or greater when the polymer is in a free state. The term "free state" used herein refers to a state that the polymer is neither fixed on a substrate nor restricted in volume change by contact with an adhesive surface. In other words, "free state" means a state that the polymer is dispersed in a solvent or a state equivalent to the dispersion state. If the volume ratio is smaller than 5, sufficient light controlling contrast is not ensured.

No specific limitation is imposed on a shape of a polymer particle used in the invention and the shape may be sphere, ellipsoid, polyhedron, porous, star-shaped, needle-shaped, hollow, or the like. Among them, a sphere particle is especially preferable since a sphere particle enables isotropic swelling/contraction of a polymer particle. Sizes of polymer particles at the time of maximum contraction when the particles are circular are preferably in the range of from 0.1 μm to 5 mm and more preferably in the range of from 1 μm to 1 mm in terms of average particle diameter. If the average particle diameter is 0.1 μm or less, polymer particles are hard to handle and may cause a problem that excellent optical characteristics cannot be achieved. On the other hand, if the average particle diameter is larger than 5 mm, in some cases, a problem arises that a response time required for a volume change becomes greatly long.

For example, the polymer particles may be prepared by physically pulverizing a polymer, or by chemically dividing a polymer prior to cross-linking into particles, followed by cross-linking. Alternatively, the polymer particles may be prepared by a common polymerization method for obtaining polymer particles such as an emulsion polymerization method, a suspension polymerization, or a dispersion polymerization.

In order to increase a speed of a volume change of a polymer particle caused by a change in electric field, it is preferable to use porous polymer particles so as to improve outflow and inflow of a liquid from or to the polymer particles. Porous particles are preferred also in conventional techniques. Polymer particles each being porous can be generally prepared by a method of freeze-drying a swollen polymer.

Other Component Materials of Polymer

It is preferable that a light controlling material should be contained in a polymer. As described above, a light controlling material may also have a property as a chargeable particle.

Specific examples of light controlling materials include dyes, pigments, and light scattering materials. A light controlling material is preferably fixed in a chargeable polymer physically or chemically.

Preferable examples of the dye include: nigrosine-based dyes in black; azo dyes in red, green, blue, cyan, magenta, yellow and the like; anthraquinone-based dyes; indigo-based dyes; phthalocyanine-based dyes; carbonium dyes; quinoimine dyes; methine dyes; quinoline dyes; nitro dyes; benzoquinone dyes; naphthoquinone dyes; naphthalimide dyes; berinone dyes; and the like. Among them, dyes having high light absorption coefficients are preferable.

Specific examples thereof include: C. I. Direct Yellow 1, 8, 11, 12, 24, 26, 27, 28, 33, 39, 44, 50, 58, 85, 86, 87, 88, 89, 98 and 157; C. I. Acid Yellow 1, 3, 7, 11, 17, 19, 23, 25, 29, 38, 44, 79, 127, 144 and 245; C. I. Basic Yellow 1, 2, 11 and 34; C. I. Food Yellow 4, C. I. Reactive Yellow 37, C. I. Solvent Yellow 6, 9, 17, 31, 35, 100, 102, 103 and 105; C. I. Direct Red 1, 2, 4, 9, 11, 13, 17, 20, 23, 24, 28, 31, 33, 37, 39, 44, 46, 62, 63, 75, 79, 80, 81, 83, 84, 89, 95, 99, 113, 197, 201, 218, 220, 224, 225, 226, 227, 228, 229, 230 and 231; C. I. Acid Red 1, 6, 8, 9, 13, 14, 18, 26, 27, 35, 37, 42, 52, 82, 85, 87, 89, 92, 97, 106, 111, 114, 115, 118, 134, 158, 186, 249, 254 and 289; C. I. Basic Red 1, 2, 9, 12, 14, 17, 18 and 37; C. I. Food Red 14; C. I. Reactive Red 23 and 180; C. I. Solvent Red 5, 16, 17, 18, 19, 22, 23, 143, 145, 146, 149, 150, 151, 157 and 158; C. I. Direct Blue 1, 2, 6, 15, 22, 25, 41, 71, 76, 78, 86, 87, 90, 98, 163, 165, 199 and 202; C. I. Acid Blue 1, 7, 9, 22, 23, 25, 29, 40, 41, 43, 45, 78, 80, 82, 92, 93, 127 and 249; C. I. Basic Blue 1, 3, 5, 7, 9, 22, 24, 25, 26, 28 and 29; C. I. Food Blue 2, C. I. Solvent Blue 22, 63, 78, 83 to 86, 191, 194, 195 and 104; C. I. Direct Black 2, 7, 19, 22, 24, 32, 38, 51, 56, 63, 71, 74, 75, 77, 108, 154, 168 and 171; C. I. Acid Black 1, 2, 7, 24, 26, 29, 31, 44, 48, 50, 52 and 94; C. !. Basic Black 2 and 8; C. I. Food Black 1 and 2; C. I. Reactive Black 31; C. I. Food Violet 2; C. I. Solvent Violet 31, 33 and 37; C. I. Solvent Green 24 and 25; C. I. Solvent Brown 3 and 9 and the like. The dyes may be used either alone or in combination in order to obtain a desired hue.

In order to fix a dye in a polymer, it is preferable to use a dye having a structure including a polymerizable group such as an unsaturated double bond group or a so-called reactive dye capable of reacting with a polymer. A preferable concentration of a dye contained in a polymer is in the range of from 3% by mass to 95% by mass, more preferably in the range of from 5% by mass to 80% by mass. If the concentration is less than 3% by mass, a light controlling function lessens. If the concentration is more than 95% by mass, a material having a good strength cannot be obtained in some cases.

Specific examples of pigments include: black pigments such as bronze powder, a titanium black, various kinds of carbon black (channel black, furnace black and the like), color pigments such as phthalocyanine-based cyan pigments, benzidine-based yellow pigments, rhodamine-based magenta pigments; and in addition, various kinds of other pigments such as athraquinone-based pigments, azo-based pigments, azo metal complexes, phtalocyanine-based pigments, quinacridone-based pigments, perylene-based pigments, indigo-based pigments, isoindolinone-based pigments, allylamide-based pigments, and zinc sulfide.

Examples of yellow type pigments include compounds represented by the following compounds: condensed azo compounds, isoindolinone compounds, anthraquinone compounds, azo metal complexes, methine compounds and allylamide compounds.

To be more detailed, preferably used are C. I. Pigment Yellow 12, 13, 14, 15, 17, 62, 74, 83, 93, 94, 95, 109, 110, 111, 128, 129, 147, 168 and the like.

Examples of magenta pigments include: condensed azo compounds; diketopyrroropyrole compounds; anthraquinone compounds; quinacridone compounds; basic dye lake compounds; naphthol compounds; benzimidazolone compounds; thioindigo compounds and perylene compounds. To be more specific, especially preferable are C. I. Pigment Red 2, 3, 5, 6, 7, 23, 48:2, 48:3, 48:4, 57:1, 81:1, 144, 146, 166, 169, 177, 184, 185, 202, 206, 220, 221 and 254.

Examples of cyan pigments include: copper-phthalocyanine compound and derivative thereof; anthraquinone compound; and basic dye lake compound. To be specific, especially preferable are C. I. Pigment Blue 1, 7, 15, 15:1, 15:2, 15:3, 15:4, 60, 62, 66 and the like.

The pigments and dyes may be used singly or in combination in order to obtain a desired hue. However, a pigment is more preferable than a dye from the viewpoint of weather resistance.

As a specific example of a light scattering material, a material having a refractive index which is different from that of a liquid used for volume change of a polymer is preferable. No further limitation is imposed on a light scattering material and various kinds of inorganic compounds and organic compounds can be used.

Specific examples of inorganic compounds include inorganic oxides such as zinc oxide, basic lead carbonate, basic lead sulfate, lead sulfate, lithopone, muscovite, zinc sulfide, titanium oxide, antimony oxide, lead white, zirconium oxide, alumina, micanite, micalex, quartz, calcium carbonate, gypsum, clay, silica, silicic acid, diatomaceous earth, talc, basic magnesium carbonate, alumina white, gloss white, and satin white; metal materials such as zinc, alumel, antimony, aluminum, aluminum alloy, iridium, indium, osmium, chrome, chromel, cobalt, zirconium, stainless steel, gold, silver, German silver, copper, bronze, tin, tungsten, tungsten steel, iron, lead, nickel, nickel alloy, nickelin, platinum, platinum-rhodium, tantalum, duralmin, nichrome, titanium, Krupp austenite steel, constantan, brass, platinum-iridium, palladium, palladium alloy, molybdenum, molybdenum steel, manganese, manganese alloy, rhodium, and rhodium alloy; and inorganic conductive materials such as ITO (indium tin oxide).

Specific examples of the organic compounds used as light scattering materials include polymer materials such as phenol resin, furan resin, xylene-formaldehyde resin, urea resin, melamine resin, aniline resin, alkyd resin, unsaturated polyester, epoxy resin, polyethylene, polypropylene, polystyrene, poly-p-xylylene, polyvinyl acetate, acrylic resin, methacrylic resin, polyvinyl chloride, polyvinylidene chloride, fluoroplastics, polyacrylonitrile, polyvinyl ether, polyvinyl ketone, polyether, polycarbonate, thermoplastic polyester, polyamide, diene plastics, polyurethane plastics, polyphenylene, polyphenylene oxide, polysulfone, aromatic heterocyclic polymer, silicone, natural rubber plastics, cellulose plastics, and mixed materials (polymer blends) each containing two or more polymers selected from the above-cited polymers described above. Hollow fine particles made of the above resins may also be uses as light scattering material's.

Further, a polymer material containing a light scattering material listed above can be used as a light scattering material. No specific limitation is imposed on the polymer material used in the light scattering material and various kinds of polymer resins can be used. Preferable example of the polymer resin include the specific examples cited as the organic compounds that can be used as light scattering materials.

No specific limitation is imposed on shapes of the pigments and the light scattering materials and various kinds of shapes may be used such as particle-shaped, block-shaped, film-shaped, irregular shape, and fiber-shaped. Among them, particle-shaped pigments and particle-shaped light scattering materials are particularly preferable since such pigments and materials have high color developing ability and high light scattering ability, and can be applied to a wide range of applications. No specific limitation is imposed on specific shapes of the particle-shaped pigments or materials, and examples thereof include sphere, ellipsoid, polyhedron, porous, star-shaped, needle-shaped, hollow, and scale-shaped.

Preferable sizes of a pigment and a light scattering material when they are particle-shaped are in the range of from 0.01 $\mu$m to 500 $\mu$m, more preferably in the range of from 0.05 $\mu$m to 100 $\mu$m in terms of average particle diameter. Such a size is preferred since if the average particle diameter is 0.01 $\mu$m or less, or 500 $\mu$m or more, a color developing effect and a light scattering effect required for a pigment and a light scattering material are not ensured. Further, if the average particle diameter is 0.01 $\mu$m or less, a pigment and a light scattering material easily flow out from the interior of polymer particles. The particles can be produced by a common physical pulverization method or a common chemical pulverization method.

It is preferable that a pigment or a light scattering material should have an acid group such as carboxyl group and a sulfonic group or a polar group such as a hydroxyl group, an amino group, a thiol group, a halogen atom, a nitro group, and a carbonyl group in a molecule thereof, and thus should have a characteristic to cause an aggregation in a polymer when its concentration is high.

It is preferable that a pigment or a light scattering material should be contained in a polymer in a stable fixed state and thereby should not flow out from the interior of the polymer. In order to prevent outflow of a pigment or a light scattering material, it is possible to use a pigment or a light scattering material having a particle size which is larger than a mesh size of a network in the polymer to be used, to use a pigment or a light scattering material making strong electrical, ionic or physical interaction with the polymer and to use a pigment or a light scattering material whose surface has been chemically modified.

Examples of the colorant or the light scattering material whose surface has been chemically modified include, a colorant or a light scattering material having a surface to which a group chemically combining with a polymer is introduced, and a colorant or a light scattering material to which a polymer material is grafted.

It is preferable that a concentration of a colorant contained in a polymer should become higher than a saturated absorption concentration at least in part of the polymer when the polymer contracts. The expression the "higher than a saturated absorption concentration" used herein refers to a concentration at which a light absorption efficiency per a unit colorant begin to decrease when a colorant concentration is increased. In other words, the expression "higher than a saturated absorption concentration" refers to a colorant concentration at which a relation between a colorant concentration and an optical absorbing amount on a specific optical path greatly deviates from a linear relation.

As a colorant concentration increases beyond a saturated absorption concentration, a light absorption efficiency per one colorant particle or one colorant molecule decreases. Therefore a light absorbing amount stops following proportional relationship with a colorant concentration and becomes less than a light absorbing amount expected by the linear relation. On the other hand, in a region less than the saturated absorption concentration, a light absorbing amount is proportional to a colorant concentration, therefore, a light absorption efficiency per one particle of the colorant or one molecule thereof is almost constant. Accordingly, when a colorant is incorporated into a polymer at a concentration higher than the saturated absorption concentration, light can be absorbed efficiently when the polymer swells and a light absorbing amount when the polymer swells is larger than that when the polymer contracts.

If a colorant is contained such that the concentration of the colorant is higher than the saturated absorption concentration when the polymer contracts, a light absorption efficiency per one colorant particle or one colorant molecule is raised when the polymer swells since the colorant concentration decreases. As a result, it is possible to increase a light absorbing amount greatly when the polymer swells and also to decrease the light absorbing amount considerably when the polymer contracts.

On the other hand, if a colorant is contained such that the concentration of the colorant is lower than the saturated absorption concentration when the polymer contracts, a light absorption efficiency per one colorant particle or one colorant molecule when the polymer swells is nearly the same as that when the polymer contracts. As a result, it is impossible to increase a light absorbing amount greatly when the polymer swells and also to decrease the light absorbing amount considerably when the polymer contracts. From the above explanation, it can be said that a polymer in its contraction state should comprise a colorant at a concentration which is equal to or higher than a saturated absorption concentration in order to greatly increase a change in light absorbing amount between swelling state and contracting state. By setting a colorant concentration at a concentration which is higher than the saturated absorption concentration, a display contrast can be improved.

A suitable concentration of a colorant in a polymer for satisfying the above condition and obtaining satisfactory characteristics varies based on a particle diameter, a refractive index, a light absorption coefficient, a specific gravity or the like of the colorant. However, generally, a concentration of a colorant contained in a polymer is preferably in the range of from 3% by weight to 95% by weight and more preferably in the range of from 5% by weight to 80% by weight in a stimulus-responsive polymer in a dry state. If the concentration of the colorant is 3% by weight or lower, a color developing amount of a color controlling material does not change even when a volume of the polymer in the color controlling material changes. Further, with such low concentration of a colorant, problems arise such as a problem that a thickness of an optical element required for obtaining sufficient light controlling contrast increases. On the other hand, if the concentration of the colorant is 95% by weight or higher, a polymer does not swell and contract with a good response, and an electric field responsiveness characteristic and a volume change amount of an optical element decline.

For a reason similar to that in the case of a colorant concentration, it is preferable that a concentration of a light scattering material in a polymer becomes higher than a saturated scattering concentration at least in part of the polymer when the polymer contracts. The expression "higher than a saturated scattering concentration" used herein refers to a concentration at which light scattering of the light scattering material changes from scattering by primary particles to scattering by aggregation to decrease an efficiency of light scattering. The change in the light scattering characteristics is caused by sufficient decrease in an average distance between adjacent particles of a light scattering material. A state in which a light scattering material shows such light scattering by aggregation is expressed as a state in which a concentration of the light scattering material is higher than the saturated scattering concentration. In other words, the expression "higher than a saturated scattering concentration" refers to a light scattering material concentration at which a relation between the concentration and a light scattering amount on a specific optical path greatly deviates from a linear relation.

A suitable concentration of a light scattering material for achieving the above-mentioned condition varies based on characteristics of the light scattering material such as a particle diameter, a refractive index, a conductivity, and a specific gravity. However, in general, a concentration of a light scattering material in a polymer in a dry state is preferably in the range of from 2% by weight to 95% by weight and more preferably in the range of from 5% by weight to 95% by weight. If a concentration of a light scattering material is 2% by weight or lower, a light scattering amount of the light scattering material does not change even when a volume of the polymer changes. Further, with a low concentration of a light scattering material, a problem occurs that it is necessary to increase a thickness of an optical element in order to attain a sufficient contrast. On the other hand, when a concentration of a light scattering material is 95% by weight or higher, the polymer does not swell and contract with a good response to decline an electric field responsiveness of the optical element and a volume change amount of the optical element.

A colorant or a light scattering material can be introduced into a polymer by a method such as:

a method in which a colorant or a light scattering material is uniformly dispersed in a polymer prior to cross-linking, followed by cross-linking, or a method in which a colorant or a light scattering material is added to a polymer precursor composition, followed by polymerization. When a colorant or a light scattering material is added to a polymer precursor composition, a colorant or a light scattering material each having a polymerizable group or an unpaired electron (a radical) is also preferably used as described above so that the colorant or the light scattering material is bonded to the polymer by a chemical bond. It is preferable to disperse a colorant or a light scattering material as uniformly as possible. Especially, it is preferable to disperse a colorant or a light scattering material uniformly in a polymer by a mechanical kneading method, by an agitating method, or by using a dispersant.

A chargeable polymer containing such a light controlling material can be prepared by a method such as:

a method in which a light controlling material is uniformly dispersed in a polymer prior to cross-linking, followed by cross-linking, or a method in which a light controlling material is added to a polymer precursor composition, followed by polymerization.

When a pigment or a light scattering material is added to a polymer precursor composition, a pigment or a light scattering material each having a polymerizable group or an unpaired electron (a radical) is also preferably used as described above so that the pigment or the light scattering material is bonded to the chargeable polymer by a chemical bond.

It is preferable to disperse a light controlling material as uniformly as possible. It is preferable to disperse a light controlling material uniformly in a polymer by a mechanical kneading method, by an agitating method, or by using a dispersant.

As described above, the light controlling material listed above can also be used as a charging agent contained in a chargeable polymer. While a chargeable polymer can be charged by contact charging between a light controlling material and a solvent contained in a chargeable polymer, it is more preferable to allow a surface of the light controlling material to have a charge imparting function. A charge imparting function can be provided to a surface of a light controlling material by introducing an amino group, an ammonium group, a halogen atom, a hydroxyl group, a carboxyl group, a sulfonic acid group, a phosphoric acid group, an amide group, a thionyl group or the like to a surface of the light controlling material.

Liquid

A liquid absorbing amount of a chargeable polymer when the polymer swells is preferably in the range of from 2 g/g to 200 g/g per 1 g of the polymer. If the liquid absorbing amount is less than 2 g/g, suppression of aggregation of chargeable polymer particles and a color purity cannot be ensured. When the liquid absorbing amount is more than 200 g/g, a concentration of a light controlling material in a chargeable polymer decreases and such decrease may reduces a light controlling contrast.

While a liquid absorbed by or released from a polymer is not particularly restricted in electric characteristics, the liquid especially preferably has a high insulating property. In this case, a volume resistivity is preferably $10^3$ Ω·cm or higher, more preferably in the range of from $10^7$ Ω·cm to $10^{19}$ Ω·cm and still more preferably in the range of from $10^{10}$ Ω·cm to $10^{19}$ Ω·cm. With such a volume resistivity, generation of gas bubbles caused by electrolysis of a liquid in an electrode reaction is effectively suppressed; therefore, light controlling characteristics are maintained even when current is repeatedly supplied, thereby enabling an excellent stability in repeated current supply.

A liquid or a polymer may contain an acid, an alkali, a salt, a dispersion stabilizer, a stabilizer for preventing oxidation or for absorbing ultraviolet, an antimicrobial agent, an anticeptic agent or the like. An amount of addition thereof is preferably determined so that a volume resistivity of the liquid falls in the above shown specific range.

Examples of the liquid include: aliphatic hydrocarbons, aromatic hydrocarbons, ethers, ketones, esters, alcohols, and silicones. Specific examples thereof include hexane, cyclohexane, toluene, xylene, decane, hexadecane, kerosene, paraffin, isoparaffin, silicone oil, dichloroethylene, trichloroethylene, perchloroethylene, high purity petroleum, ethylene glycol, methanol, ethanol, propanol, butanol, glycerin, tetrahydrofuran, dioxane, higher esters, dimethylformamide, dimethylacetamide, dimethylsulfoxide, N-methylpyrrolidone, 2-pyrrolidone, N-methylformamide, acetonitrile, tetrahydrofuran, propylene carbonate, ethylene carbonate, benzine, diisopropylnaphthalene, olive oil, isopropanol, trichlorotrifluoroethane, tetrachloroethane, dibromotetrafluoroethane, and mixtures thereof. Water (a so-called pure water) from which impurities are eliminated so that a volume resistivity falls in the above shown range can be preferably used.

According to the invention, a liquid and a chargeable polymer (a chargeable polymer containing a light controlling material) is preferably selected so that a difference in refractive index between them is 0.01 or less. This is because a light scattering property decreases at particle boundaries to improve a hue purity. With such a combination of a liquid and a chargeable polymer having a small difference in refractive index, when the chargeable polymer particles after being colored are used, incident light is not scattered even in a color-developing state and transmitted through the optical element; accordingly, such a combination can be applied to a transmission optical element.

A polymer or a liquid used in the invention may further contain: a colorant, a polymer, an acid, an alkali, a salt, a surfactant, a dispersion stabilizer, a defoaming agent, or a stabilizer such as an antioxidant, an ultraviolet absorber, an anticeptic agent, or an antimicrobial agent, in accordance with necessity.

Electrode, Substrate and the Like

Examples of substrates that can be used in an optical element include: film and sheet-like substrates made of polyester, polyimide, polyolefin, acrylic resin such as polymethyl (meth)acrylate, polystyrene, polyethylene, polypropylene, polyethersulfone, Nylon, polyurethane, polyvinyl chloride, and polyvinylidene chloride; a glass substrate; a metal; a metal film; and a ceramic sheet. While a thickness of a substrate is preferably in the range of from 10 µm to 2 mm, the thickness are not particularly restricted and may be selected in accordance with necessity.

In an optical element according to the invention, in order to apply an electric field, it is especially preferable to provide an electrode on at least one of paired substrates. The electrode provided on a substrate may be either an electrode covering the entire surface of the substrate (a so-called solid electrode) or an electrode divided into segments or divided in a pattern.

While no specific limitation is imposed on a material of which an electrode is made as far as a material is at least a material that transmit a current. Specific preferable examples thereof include electrodes made of metal films of metals represented by copper, aluminum, silver, gold, nickel, platinum and the like; electrodes made of metal oxides represented by tin oxide and indium tin oxide (ITO); electrodes made of conductive polymers represented by polypyrroles, polythiophenes, polyanilines, polyphenylenevinylenes, polyacenes, polyacetylenes and the like; electrodes made of composite materials of polymers with metal or metal oxide particles described above.

While an electrode structure may also have wiring for simple matrix driving, the structure can also be provided with a switching element such as a thin film transistor (TFT) element or a two terminal element such as a MIM element or a varistor.

Any material can be used as a sealing material as long as the material has an ability to suppress evaporation of a solvent from a light controlling material, has adhesiveness to a substrate, exerts no adverse influence on a characteristic of a light controlling material, and retain the above characteristics in practical use for a long time. It is possible to use a plurality kinds of sealing materials in combination. Specific examples of the sealing material include various kinds of resins, curable resins, inorganic materials, sol-gel materials, mixtures of an organic material and an inorganic material such as a inorganic filler.

It is preferable to place a spacer between facing surfaces of an optical element of the invention in order to secure a sufficiently uniform clearance for holding a polymer particle and a liquid absorbed by or discharged from a polymer when a volume of polymer particles changes, and in order to prevent an image defect. A volume of a spacer is preferably as small as possible.

A spacing between substrates (a distance between two facing surfaces) secured by a spacer is preferably in the range of from 1 µm to 5 mm and in a case of a small size optical element, the spacing is more preferably in the range of from 10 µm to 20 µm. If the spacing between the facing surfaces is smaller than 1 µm, a light controlling amount is not ensured. If the spacing is 5 mm or more, a responsiveness characteristic of an optical element is not ensured.

No specific limitation is imposed on a shape of a spacer as far as it maintains a constant clearance between two facing surfaces. Spacers having independent shapes such as sphere, cubic, and pole-shaped are preferable. Spacers having continuous shapes can also be used. In the latter case, a spacer may function for both maintaining a clearance and segmenting the interior of a light controlling layer (a layer containing a polymer and a liquid disposed between the facing surfaces) by taking net-shape. By using such a dual-functioning spacer, a malfunction of an adjacent pigment is suppressed and a display image quality is further improved.

A spacer having a continuous shape is not specifically limited as far as the spacer can maintain a constant clearance. The spacer may be a polygon such as a lattice and a honeycomb. The spacer may be in any of various other shapes. When the interior of an optical element is segmented by a spacer, a lattice-shaped spacer is most preferable in consideration of shapes of pixels and stimulus imparting means. The spacer can be made of any of materials as far as the material is stable in a liquid included in a light controlling composition. For example, the spacer may be made of a resin, a metal, a metal oxide, glass or the like.

A Layer other than the layer described above can be provided, when required, to an optical element according to the invention. The examples of such another layer include a color filter layer, an antireflection layer, a protective layer, a ultraviolet absorbing layer, a buffer layer, an anti-contamination layer, and a sealing layer.

EXAMPLES

While more specific description will be given of the present invention by showing examples, it should be understood that the invention is by no means limited to the examples.

Example 1

[Preparation of Chargeable Polymer]

Chargeable polymer particles containing a pigment were prepared by a reverse phase suspension polymerization, as explained in the following.

A solution obtained by dissolving 0.79 g of N-isopropylacrylamide, 0.2 ml of acrylic acid, 0.43 ml of triethylamine, 2.28 g of distilled water, 2.25 g of a black pigment aqueous dispersion, 2.5 mg of methylenebisacrylamide as a cross-linking agent, and 0.020 g of ammonium persulfate in 0.5 g of pure water was agitated to prepare an aqueous solution A. The above operation was conducted in a nitrogen atmosphere.

Then, dissolved into 300 g of cyclohexane contained in a beaker was 1.5 g of a sorbitol-based surfactant (with a trade name of SOLGEN 50 manufactured by Dai-ich Kogyo Seiyaku Co., Ltd.), which is a dispersion stabilizer. Then, the aqueous solution A was added to the solution in an nitrogen atmosphere and the mixture was agitated using a rotary agitating blade at 1400 rpm for 10 min to prepare an emulsion.

The temperature of the solution in the beaker was adjusted to 25° C. Then, a cyclohaxane solution containing 50% by weight of N,N,N',N',-tetramethylethylenediamine was added to the solution in the beaker to conduct polymerization while the solution in the beaker was agitated. After polymerization, formed polymer particles were recovered and dispersed in methanol.

[Surface Treatment of Substrate]

A surface of a glass, as a transparent substrate, with dimensions of 50 mm×50 mm in length and width and 3 mm in thickness and with an ITO film (a transparent electrode) provided on one surface thereof (manufactured by Matsunami Glass Industry Ltd.) was sequentially washed with acetone and a 2N NaOH aqueous solution. Thereafter, a negative photoresist was coated on the surface of the transparent substrate on which surface the ITO film was provided.

Then, a mask with a pattern, in which circular holes each having a diameter of about 3 $\mu$m arranged regularly, was placed on the surface of the transparent substrate on which surface the resist was coated. Then the resist was exposed to ultraviolet radiation, thereafter the resist was developed to remove the resist only in a region (a region other than portions corresponding to circular holes) where fixing of a polymer is to be inhibited, to expose the region. A solution obtained by adding (heptadecafluoro-1,1,2,2,-tetrahydrodecyl)triethoxysilane to toluene under agitation so that a concentration thereof was adjusted to 25% by weight was coated in the exposed region and the resultant mixture was allowed to react for 30 min.

After the wet coat was dried, all of the circular resist pattern remaining on the ITO films of the transparent substrate was removed by a etching treatment. In this way, the region other than the circular pattern on the transparent substrate was surface-treated with a fixation inhibitor.

A compound γ-aminopropyltriethoxysilane as a fixing agent was added to a 95% by weight ethanol aqueous solution while the ethanol solution was agitated, to prepare a 25% by weight γ-aminopropyltriethoxysilane solution. The solution was sprayed on the surface of the transparent substrate which surface had been partially surface-treated with the fixation inhibitor. While the solution was sprayed, the mask pattern was placed on the surface of the transparent substrate so that the circular holes of the mask pattern coincide with a circular pattern on the surface of the transparent substrate. In this way, the solution containing the fixing agent was selectively sprayed on the circular pattern after removal of the resist.

After the spraying treatment, the transparent substrate was dried. Thereafter, the mask pattern was removed from the surface of the transparent substrate. In this way, the surfaces of regularly arranged circular patterns each having a diameter of about 3 $\mu$m were treated with the fixing agent, and the surface of the of the transparent substrate in the region other than the circular patterns was treated with the fixation inhibitor. The treated surface was, of course, the surface on which the ITO film had been provided.

The transparent substrate surface-treated with the fixing agent and the fixation inhibitor was immersed in the obtained polymer dispersion in methanol for 10 hr, to allow the polymer particles to be fixed regularly only on the patterned circular portions surface-treated with the fixing agent.

Resin spacers having a diameter of 500 $\mu$m were arranged on an electrode surface (an ITO film surface) of an electrode substrate which had dimensions of 50 mm×50 mm in length and width and had an ITO film formed on one surface thereof. The transparent substrate on which the polymer particles were fixed was adhered to the electrode surface of the electrode substrate so that the electrodes face each other. In this state, the outer peripheral portion of the paired substrates was sealed with a thermal adhesive except for a solvent injection opening provided in part of the outer peripheral portion. Then, only DMF as a liquid used for swelling and contracting of the polymer was injected through the solvent injection opening and thereafter, the opening was disposed to prepare an optical element (a light controlling cell).

[Evaluation]

A DC voltage of 40 V was applied between the electrodes of the optical element and thereby it was confirmed that volume changes of the polymer particles occurred. When the electrode on which the polymer particles were fixed was an anode, the polymer particles contracted. When said electrode was a cathode, the polymer particles swelled. From this phenomenon, it was found that the polymer particles swelled and contracted according to the electric field. The contrast ratio obtained from the reflectance at this observation was 30. Thus, it was confirmed that the visibility was excellent.

Then, a DC voltage of 40 V was repeatedly applied 100,000 times while a polarity was reversed each time the DC voltage was applied. Thereafter, similar evaluation was again conducted and it was found that the contrast ratio was 30. Thus, it was confirmed that visibility was excellent similarly to the visibility before the repetitive application of voltage.

It was found from the above results that both the contrast ratio and the visibility were scarcely degraded over time, both the reduction in the volume change amount and the reduction in the responsiveness of the polymer hardly occurred. Accordingly, it was confirmed that even when the polymer repeatedly swelled and contracted (changed its volume) and contacted with the substrate surface in the region other than the portions (the adhering fixing portions) treated with the fixing agent, the polymer hardly adhered to the substrate surface. The results are shown Table 1.

Example 2

Preparation of Chargeable Polymer]

Chargeable polymer particles containing a pigment were manufactured by a reverse phase suspension polymerization, as explained in the following.

A solution obtained by dissolving 0.79 g of N-isopropylacrylamide, 0.2 ml of acrylic acid, 0.43 ml of triethylamine, 2.28 g of distilled water, 2.25 g of a black pigment aqueous dispersion, 2.5 mg of methylenebisacrylamide, which is a cross-linking agent, and 0.020 g of ammonium persulfate in 0.5 g of pure water was agitated to prepare an aqueous solution A. The above operation was conducted in a nitrogen atmosphere.

Then, dissolved into 300 g of cyclohexane contained in a beaker was 1.5 g of a sorbitol-based surfactant (with a trade name of SOLGEN 50 manufactured by Dai-ich Kogyo Seiyaku Co., Ltd.), which is a dispersion stabilizer. Then, the aqueous solution A was added to the solution in an nitrogen atmosphere and the mixture was agitated using a rotary agitating blade at 1400 rpm for 10 min to prepare an emulsion.

The temperature of the solution in the beaker was adjusted to 25° C. Then, a cyclohaxane solution containing 50% by weight of N,N,N',N',-tetramethylethylenediamine was added to the solution in the beaker to conduct polymerization while the solution in the beaker was agitated. After polymerization, formed polymer particles were recovered and dispersed in methanol.

[Surface Treatment of Substrate]

A surface of a glass, as a transparent substrate, with dimensions of 50 mm×50 mm in length and width and 3 mm in thickness and with an ITO film (a transparent electrode) provided on one surface thereof (manufactured by Matsunami Glass Industry Ltd.) was sequentially washed with acetone and a 2N NaOH aqueous solution. Thereafter, a negative photoresist was coated on the surface of the transparent substrate on which surface the ITO film was provided.

Then, a mask with a pattern, in which circular holes each having a diameter of about 3 μm arranged regularly, was placed on the surface of the transparent substrate on which surface the resist was coated. Then the resist was exposed to ultraviolet radiation, thereafter the resist was developed to remove the resist only in a region (a region other than portions corresponding to circular holes) where fixing of a polymer is to be inhibited, to expose the region. A solution obtained by adding n-octadecyltriethoxysilane to toluene under agitation so that a concentration thereof was adjusted to 20% by weight was coated in the exposed region and the resultant mixture was allowed to react for 30 min.

After the wet coat was dried, all of the circular resist pattern remaining on the ITO films of the transparent substrate was removed by a etching treatment. In this way, the region other than the circular pattern on the transparent substrate was surface-treated with a fixation inhibitor.

A compound γ-aminopropyltriethoxysilane as a fixing agent was added to a 95% by weight ethanol aqueous solution while the ethanol solution was agitated, to prepare a 25% by weight γ-aminopropyltriethoxysilane solution. The solution was sprayed on the surface of the transparent substrate which surface had been partially surface-treated with the fixation inhibitor. While the solution was sprayed, the mask pattern was placed on the surface of the transparent substrate so that the circular holes of the mask pattern coincide with a circular pattern on the surface of the transparent substrate. In this way, the solution containing the fixing agent was selectively sprayed on the circular pattern after removal of the resist.

After the spraying treatment, the transparent substrate was dried. Thereafter, the mask pattern was removed from the surface of the transparent substrate. In this way, the surfaces of regularly arranged circular patterns each having a diameter of about 3 μm were treated with the fixing agent, and the surface of the of the transparent substrate in the region other than the circular patterns was treated with the fixation inhibitor. The treated surface was, of course, the surface on which the ITO film had been provided.

The transparent substrate surface-treated with the fixing agent and the fixation inhibitor was immersed in the obtained polymer dispersion in methanol for 10 hr, to allow the polymer particles to be fixed regularly only on the patterned circular portions surface-treated with the fixing agent.

Resin spacers having a diameter of 500 μm were arranged on an electrode surface (an ITO film surface) of an electrode substrate which had dimensions of 50 mm×50 mm in length and width and had an ITO film formed on one surface thereof. The transparent substrate on which the polymer particles were fixed was adhered to the electrode surface of the electrode substrate so that the electrodes face each other. In this state, the outer peripheral portion of the paired substrates was sealed with a thermal adhesive except for a solvent injection opening provided in part of the outer peripheral portion. Then, only DMF as a liquid used for swelling and contracting of the polymer was injected through the solvent injection opening and thereafter, the opening was disposed to prepare an optical element (a light controlling cell).

[Evaluation]

A DC voltage of 40 V was applied between the electrodes of the optical element and thereby it was confirmed that volume changes of the polymer particles occurred. When the electrode on which the polymer particles were fixed was an anode, the polymer particles contracted. When said electrode was a cathode, the polymer particles swelled. From this phenomenon, it was found that the polymer particles swelled and contracted according to the electric field. The contrast ratio obtained from the reflectance at this observation was 30. Thus, it was confirmed that the visibility was excellent.

Then, a DC voltage of 40 V was repeatedly applied 100,000 times while a polarity was reversed each time the DC voltage was applied. Thereafter, similar evaluation was again conducted and it was found that the contrast ratio was 30. Thus, it was confirmed that visibility was excellent similarly to the visibility before the repetitive application of voltage.

It was found from the above results that both the contrast ratio and the visibility were scarcely degraded over time, both the reduction in the volume change amount and the reduction in the responsiveness of the polymer hardly occurred. Accordingly, it was confirmed that even when the polymer repeatedly swelled and contracted (changed its volume) and contacted with the substrate surface in the region other than the portions (the adhering fixing portions) treated with the fixing agent, the polymer hardly adhered to the substrate surface. The results are shown Table 1.

Comparative Example 1

In a method similar to that in Example 1, polymer particles containing a pigment were manufactured and thereafter, dispersed in a methanol solution to prepare a polymer dispersion.

A surface of a glass, as a transparent substrate, with dimensions of 50 mm×50 mm in length and width and 3 mm in thickness and with an ITO film (a transparent electrode) provided on one surface thereof (manufactured by Matsunami Glass Industry Ltd.) was sequentially washed with acetone and a 2N NaOH aqueous solution.

The transparent substrate was immersed for 30 min in a solution prepared by adding 4 ml of γ-aminopropyltriethoxysilane as a fixing agent to 200 ml of a 95% by weight ethanol aqueous solution under agitation. The transparent substrate taken out from the solution was lightly washed with ethanol and thereafter the transparent substrate was left in an oven at 110° C. for 30 min to cure the fixing agent layer formed on the surface of the transparent substrate.

Thereafter, the transparent substrate having the surface which had been entirely surface-treated with the fixing agent was immersed in the polymer dispersion for about 10 hr to conduct a fixing treatment. The polymer particles were fixed uniformly on the entire region on the surface of the transparent substrate which surface had been surface-treated with the fixing agent.

Resin spacers having a diameter of 500 μm were arranged on an electrode surface (an ITO film surface) of an electrode substrate which had dimensions of 50 mm×50 mm in length and width and had an ITO film formed on one surface thereof. The transparent substrate on which the polymer particles were fixed was adhered to the electrode surface of the electrode substrate so that the electrodes face each other. In this state, the outer peripheral portion of the paired substrates was sealed with a thermal adhesive except for a solvent injection opening provided in part of the outer peripheral portion. Then, only DMF as a liquid used for swelling and contracting of the polymer was injected through the solvent injection opening and thereafter, the opening was disposed to prepare an optical element (a light controlling cell).

[Evaluation]

A DC voltage of 40 V was applied between the electrodes of the optical element and thereby it was confirmed that volume changes of the polymer particles occurred. When the electrode on which the polymer particles were fixed was an anode, the polymer particles contracted. When said electrode was a cathode, the polymer particles swelled. From this phenomenon, it was found that the polymer particles swelled and contracted according to the electric field. The contrast ratio obtained from the reflectance at this observation was 30. Thus, it was confirmed that the visibility was excellent.

Then, a DC voltage of 40 V was repeatedly applied 100,000 times while a polarity was reversed each time the DC voltage was applied. Thereafter, similar evaluation was again conducted and it was found that the contrast ratio fell to 15. The visibility was also deteriorated when compared with the visibility before the repetitive application of voltage.

It was found from the above results that the contrast ratio and the visibility were degraded over time, the reduction in the volume change amount and the reduction in the responsiveness of the polymer was caused by the repetitive swelling and contraction (volume change). Accordingly, it was confirmed that the polymer contacted with the substrate surface in the region other than the portions which had been worked as fixing sites of the polymer since the production of the optical element, the polymer adhered to the substrate surface and deformed. The results are shown Table 1.

Example 3

In this example, an optical element in which polymer particles were fixed on protruding portions provided on a surface of a substrate was manufactured in the following way.

A negative photoresist was applied to a surface of a glass substrate with dimensions of 50 mm×50 mm in length and width and 3 mm in thickness. Thereafter, a photomask on which a pattern with circles of about 5 μm in diameter arranged thereon was placed on the glass substrate. The photoresist was exposed to radiation and developed to form a pattern with circles made of the photoresist on the surface of the glass substrate.

Then, in order to form the protruding portions, the patterned surface of the glass substrate was etched to form the protruding portions each in the shape of a cylinder on the surface of the glass substrate. A diameter of each of the protruding portions was about 5 μm and a height thereof was about 10 μm and a distance between adjacent protruding portions was about 40 μm. After the protruding portions were formed, the resist film left on the top portions of the protruding portions was removed with an organic solvent.

An ITO (indium tin oxide) electrode layer was formed uniformly on the surface of the substrate by a sputtering method to a thickness of about 0.1 μm on which surface the protruding portions had been formed. Thereafter, a γ-aminopropyltriethoxysilane solution similar to the solution used in Example 1 was sprayed only on the top portions of the protruding portions on the surface of the substrate by utilizing the pattern on which surface the protruding portions had been provided, followed by drying.

Then, the substrate, having the protruding portions which had been surface-treated with the fixing agent, was immersed in the polymer particle dispersion in methanol used in Example 1 for about 10 hr to fix the polymer particles regularly only on the top portions of the protruding portions.

Resin spacers having a diameter of 500 μm were arranged on an electrode surface (an ITO film surface) of an electrode substrate which had dimensions of 50 mm×50 mm in length and width and had an ITO film formed on one surface thereof. The transparent substrate on which the polymer particles were fixed was adhered to the electrode surface of the electrode substrate so that the electrodes face each other. In this state, the outer peripheral portion of the paired substrates was sealed with a thermal adhesive except for a solvent injection opening provided in part of the outer peripheral portion. Then, only DMF as a liquid used for swelling and contracting of the polymer was injected through the solvent injection opening and thereafter, the opening was disposed to prepare an optical element (a light controlling cell).

[Evaluation]

A DC voltage of 40 V was applied between the electrodes of the optical element and thereby it was confirmed that volume changes of the polymer particles occurred. When the electrode on which the polymer particles were fixed was an anode, the polymer particles contracted. When said electrode was a cathode, the polymer particles swelled. From this phenomenon, it was found that the polymer particles swelled and contracted according to the electric field. The contrast ratio obtained from the reflectance at this observation was 30. Thus, it was confirmed that the visibility was excellent.

Then, a DC voltage of 40 V was repeatedly applied 100,000 times while a polarity was reversed each time the DC voltage was applied. Thereafter, similar evaluation was again conducted and it was found that the contrast ratio was 30. Thus, it was confirmed that visibility was excellent similarly to the visibility before the repetitive application of voltage.

It was found from the above results that both the contrast ratio and the visibility were scarcely degraded over time, both the reduction in the volume change amount and the reduction in the responsiveness of the polymer hardly occurred. Accordingly, it was confirmed that even when the polymer repeatedly swelled and contracted (changed its volume) and contacted with the substrate surface in the region other than the portions (the adhering fixing portions) treated with the fixing agent, the polymer hardly adhered to the substrate surface. The results are shown Table 1.

TABLE 1

| | Contrast ratio | |
| --- | --- | --- |
| | Initial stage | After 100,000 times repetition |
| Example 1 | 30 | 30 |
| Example 2 | 30 | 30 |
| Comparative Example 1 | 30 | 15 |
| Example 3 | 30 | 30 |

As described above, the invention provides an optical element capable of maintaining a volume change amount thereof stably over time even when a chargeable polymer is repeatedly swollen and contracted by an electric field. The invention also provides a production method thereof.

What is claimed is:

1. An optical element comprising at least:
   two substrates that are disposed opposite to each other;
   a liquid disposed between facing surfaces of the opposed substrates; and
   at least one chargeable polymer particle disposed between the facing surfaces of the substrates for swelling or contracting by absorbing or releasing the liquid when an electric field is applied,
   wherein at least one of the facing surfaces includes at least an adhering fixing portion that fixes the chargeable polymer particle thereon and the chargeable polymer particle is fixed to the at least one facing surface via the adhering fixing portion,
   wherein
   (1) an area of each adhering fixing portion is smaller than a maximum sectional area of the chargeable polymer particle at the time of maximum swelling, and
   (2) a non-adhesive portion surrounds each adhering fixing portion, and the non-adhesive portion is disposed at least at a largest outer circumference of the chargeable polymer particle at the time of maximum swelling and extends inside the largest outer circumference of the chargeable polymer at the time of maximum swelling.

2. An optical element according to claim 1, wherein the chargeable polymer particle is fixed to the at least one facing surface via the adhering fixing portion by at least one kind of chemical bond selected from the group consisting of a hydrogen bond, an ionic bond and a covalent bond.

3. An optical element according to claim 1, wherein a surface of the adhering fixing portion includes a silane coupling agent.

4. An optical element according to claim 1, wherein a surface tension of the non-adhesive portion is 30 mN/m or less.

5. An optical element according to claim 1, wherein a surface of the non-adhesive portion is covered with a fluorine-containing material.

6. An optical element according to claim 1, wherein the liquid is an insulating liquid.

7. An optical element according to claim 1, wherein an electrode is provided on at least one facing surface of the substrates.

8. An optical element according to claim 1, wherein the at least one chargeable polymer particle includes a light controlling material.

9. An optical element according to claim 1, wherein the at least one chargeable polymer particle includes a chargeable particle.

10. An optical element according to claim 9, wherein the at least one chargeable particle is a light controlling material.

11. An optical element according to claim 9, wherein the at least one chargeable polymer particle comprises a non-ionic polymer.

12. An optical element according to claim 9, wherein the at least one chargeable polymer particle comprises an ionic polymer.

13. An optical element according to claim 1, wherein the at least one chargeable polymer particle comprises an ionic polymer.

14. A method for producing an optical element which comprises at least:
   two substrates that are disposed opposite to each other;
   a liquid disposed between facing surfaces of the opposed substrates; and
   at least one chargeable polymer particle disposed between the facing surfaces of the substrates for swelling or contracting by absorbing or releasing the liquid when an electric field is applied,
   wherein at least one of the facing surfaces includes at least an adhering fixing portion that fixes the chargeable polymer particle thereon and the chargeable polymer particle is fixed to the at least one facing surface via the adhering fixing portion,
   wherein
   (1) an area of each adhering fixing portion is smaller than a maximum sectional area of the chargeable polymer particle at the time of maximum swelling, and
   (2) a non-adhesive portion surrounds each adhering fixing portion, and the non-adhesive portion is disposed at least at a largest outer circumference of the chargeable polymer particle at the time of maximum swelling and extends inside the largest outer circumference of the chargeable polymer at the time of maximum swelling,
   the method comprising:
   a fixation inhibitor providing step of providing the fixation inhibitor to the at least one facing surface;
   a fixing agent providing step of providing the fixing agent to the at least one facing surface; and
   a patterning step of forming a region on the at least one facing surface to which region at least one agent selected from the group consisting of the fixation inhibitor and the fixing agent can be selectively provided.

15. An optical element comprising at least:
   two substrates that are disposed opposite to each other;
   a liquid disposed between facing surfaces of the opposed substrates; and
   at least one chargeable polymer particle disposed between the facing surfaces of the substrates for swelling or contracting by absorbing or releasing the liquid when an electric field is applied, wherein at least one of the facing surfaces includes at least an adhering fixing portion that fixes the chargeable polymer particle thereon and the chargeable polymer particle is fixed to the at least one facing surface via the adhering fixing portion, wherein (3) an area of each adhering fixing portion is smaller than a maximum sectional area of the chargeable polymer particle at the time of maximum swelling, and (4) at least one protruding portion is provided on the at least one facing surface and the adhering fixing portion is provided on a surface of the protruding portion.

16. An optical element according to claim 15, wherein a height of the protruding portion is in a range of 1 μm to 100 μm.

17. An optical element according to claim 15, wherein the at least one chargeable polymer particle is fixed to the surface of the at least one protruding portion via the at least one adhering fixing portion by at least one kind of chemical bond selected from the group consisting of a hydrogen bond, an ionic bond and a covalent bond.

18. An optical element according to claim 15, wherein a surface of the adhering fixing portion includes a silane coupling agent.

19. An optical element according to claim 15, wherein the liquid is an insulating liquid.

20. An optical element according to claim 15, wherein an electrode is provided on at least one facing surface of the substrates.

21. An optical element according to claim 15, wherein the at least one chargeable polymer particle includes a light controlling material.

22. An optical element according to claim 15, wherein the at least one chargeable polymer particle includes a chargeable particle.

23. An optical element according to claim 22, wherein the at least one chargeable particle is a light controlling material.

24. An optical element according to claim 22, wherein the at least one chargeable polymer particle comprises a non-ionic polymer.

25. An optical element according to claim 22, wherein the at least one chargeable polymer particle comprises an ionic polymer.

26. An optical element according to claim 15, wherein the at least one chargeable polymer particle comprises an ionic polymer.

27. A method for producing an optical element comprising at least:

two substrates that are disposed opposite to each other;

a liquid disposed between facing surfaces of the opposed substrates; and at least one chargeable polymer particle disposed between the facing surfaces of the substrates for swelling or contracting by absorbing or releasing the liquid when an electric field is applied, wherein at least one of the facing surfaces includes at least an adhering fixing portion that fixes the chargeable polymer particle thereon and the chargeable polymer particle is fixed to the at least one facing surface via the adhering fixing portion, wherein (3) an area of each adhering fixing portion is smaller than a maximum sectional area of the chargeable polymer particle at the time of maximum swelling, and (4) at least one protruding portion is provided on the at least one facing surface and the adhering fixing portion is provided on a surface of the protruding portion, the method comprising at least a fixing agent providing step of providing the fixing agent selectively to the surface of the protruding portion by using a pattern.

* * * * *